US012779745B2

(12) United States Patent
Sugisaki et al.

(10) Patent No.: US 12,779,745 B2
(45) Date of Patent: Nov. 3, 2026

(54) CONTROL METHOD OF LAMINATE MOLDING SYSTEM AND LAMINATE MOLDING SYSTEM

(71) Applicant: THE JAPAN STEEL WORKS, LTD., Tokyo (JP)

(72) Inventors: Keiichirou Sugisaki, Tokyo (JP); Takayuki Yamamoto, Tokyo (JP); Kenji Fukumoto, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 18/856,810

(22) PCT Filed: Mar. 13, 2023

(86) PCT No.: PCT/JP2023/009668
§ 371 (c)(1),
(2) Date: Oct. 14, 2024

(87) PCT Pub. No.: WO2023/203920
PCT Pub. Date: Oct. 26, 2023

(65) Prior Publication Data

US 2025/0256435 A1 Aug. 14, 2025

(30) Foreign Application Priority Data

Apr. 19, 2022 (JP) ................................ 2022-068931
May 24, 2022 (JP) ................................ 2022-084630

(51) Int. Cl.
*B29C 43/14* (2006.01)
*B29C 43/18* (2006.01)
(Continued)

(52) U.S. Cl.
CPC ............ *B29C 43/58* (2013.01); *B29C 43/146* (2013.01); *B30B 1/181* (2013.01); *B30B 1/186* (2013.01);
(Continued)

(58) Field of Classification Search
CPC ....... B29C 43/14; B29C 43/146; B29C 43/18; B29C 43/58; B29C 2043/5808;
(Continued)

(56) References Cited

U.S. PATENT DOCUMENTS

2006/0169020 A1 8/2006 Takayama
2014/0182462 A1* 7/2014 Hoshika ................. B30B 15/00 100/41
2018/0162111 A1 6/2018 Iwata et al.

FOREIGN PATENT DOCUMENTS

CN 103327943 A 9/2013
CN 105773891 A 7/2016
(Continued)

OTHER PUBLICATIONS

International Search Report for International Patent Application No. PCT/JP2023/009668, May 30, 2023.
(Continued)

*Primary Examiner* — Leo B Tentoni
(74) *Attorney, Agent, or Firm* — Potomac Law Group, PLLC

(57) ABSTRACT

A control method of a laminate molding system is a control method of a laminate molding system in which at least two press apparatuses are consecutively provided and a laminate molded product having been pressure-molded by the press apparatus in a previous step is further pressure-molded by the press apparatus in a subsequent step, wherein a physical quantity during pressure-molding or after pressure-molding by the press apparatus in the previous step is measured and
(Continued)

the physical quantity is used to control the press apparatus in the subsequent step. Accordingly, a control method of a laminate molding system and a laminate molding system capable of favorably performing laminate molding of a laminate molded product can be provided.

6 Claims, 7 Drawing Sheets

(51) Int. Cl.

| | |
|---|---|
| ***B29C 43/58*** | (2006.01) |
| ***B30B 1/18*** | (2006.01) |
| ***B30B 15/14*** | (2006.01) |
| ***B32B 37/10*** | (2006.01) |

(52) U.S. Cl.
CPC ................. *B29C 2043/5808* (2013.01); *B29C 2043/5825* (2013.01)

(58) Field of Classification Search
CPC ... B29C 2043/5825; B30B 1/18; B30B 1/181; B30B 1/186; B30B 15/14; B32B 37/10
USPC ....... 264/40.1, 320, 325; 425/135, 141, 383, 425/394; 100/35, 43, 48
See application file for complete search history.

(56) References Cited

FOREIGN PATENT DOCUMENTS

| | | | |
|---|---|---|---|
| JP | 2002-120100 | A | 4/2002 |
| JP | 2019-217725 | A | 12/2019 |
| JP | 2020-028980 | A | 2/2020 |
| JP | 6878365 | B2 | 5/2021 |
| JP | 2021-100802 | A | 7/2021 |
| JP | 2022-015589 | A | 1/2022 |
| JP | 7025499 | B1 | 2/2022 |
| JP | 2022-050807 | A | 3/2022 |
| JP | 7073551 | B1 | 5/2022 |
| WO | 2004/096533 | A1 | 11/2004 |
| WO | 2016/199687 | A1 | 12/2016 |
| WO | 2020/111061 | A1 | 6/2020 |

OTHER PUBLICATIONS

Decision to Grant Patent issued Jul. 12, 2022, in Japanese Patent Application No. 2022-084630.
Office Action issued Jun. 8, 2026, in Chinese Patent Application No. 202380034716.0.
Office Action issued Sep. 16, 2026, in Taiwanese Patent Application No. 112113965.

* cited by examiner

CONTROL METHOD OF LAMINATE MOLDING SYSTEM AND LAMINATE MOLDING SYSTEM

TECHNICAL FIELD

The present invention relates to a control method of a laminate molding system in which at least two press apparatuses are consecutively provided and a laminate molded product having been pressure-molded by a press apparatus in a previous step is further pressure-molded by a press apparatus in a subsequent step, and to a laminate molding system.

BACKGROUND ART

As a laminate molding system in which at least two press apparatuses are consecutively provided and a laminate molded product having been pressure-molded by a press apparatus in a previous step is further pressure-molded by a press apparatus in a subsequent step, laminate molding systems described in Patent Literature 1 and Patent Literature 2 are known. A laminate molding apparatus according to Patent Literature 1 is described to include a first flattening press machine 2 and a second flattening press machine 3 after a vacuum laminator 1. In addition, a laminating apparatus according to Patent Literature 2 is described to include vacuum laminating means 1, first planar pressing means 2, and second planar pressing means 3. It is also described that at least one of a pair of plates of the second planar pressing means 3 is capable of moving toward or away from the other plate due to actuation of a servomotor and it is further described that in the second planar pressing means, a lower press block is raised by the servomotor, a distance between a metal plate (plate-shaped body) and a metal plate (plate-shaped body) is set so as to be shorter than a thickness of a temporary laminate (B) by 20 μm, and the temporary laminate (B) is pressed for 60 seconds to fabricate a laminated body 103.

However, with all of the flattening press machines, planar pressing means, and the like described above, it is common practice to perform press status detection and output a control value using the detected value for each press apparatus.

CITATION LIST

Patent Literature

Patent Literature 1: Japanese Unexamined Patent Application Publication No. 2002-120100

Patent Literature 2: Japanese Unexamined Patent Application Publication No. 2020-28980

SUMMARY OF INVENTION

However, Patent Literature 1 only describes that the flattening press of the laminate molding apparatus uses a hydraulic cylinder and there is no mention whatsoever of a measurement of thickness and the like. On the other hand, in the laminating apparatus according to Patent Literature 2, the first planar pressing means performs hydraulic-based control and is not equipped with a mechanism for detecting distance information such as a linear scale. While the second planar pressing means 3 is equipped with a linear scale and is capable of measuring thickness of the temporary laminate (B) having been sent from the first planar pressing means, the second planar pressing means 3 has the following problems.

In the case of Patent Literature 2, when raising the lower press block, measuring the thickness of the temporary laminate (B), and outputting a control value using a measured value in the second planar pressing means, there is a problem in that the temporary laminate (B) is in a state where a laminate film has been softened and it is difficult to accurately measure the thickness during contact. In the second planar pressing means, the lower press block must be continuously raised at a constant speed in order to prevent molding cycles from becoming too long. In addition, even when attempting to detect a contact with the temporary laminate (B) by detecting an increase in a torque of the servomotor, the increase in the torque can be detected only after a certain amount of pressure or more is applied to the temporary laminate (B). Therefore, when the increase in the torque is detected in the second planar pressing means, since the temporary laminate (B) having been already softened is often excessively pressed and made too thin, accurate thickness cannot be measured.

As a result, it can be sufficiently surmised that, in reality, controlling accurate thickness is difficult even if the thickness is set so as to be shorter than the thickness of the temporary laminate (B) by 20 μm as described above. Therefore, it can be sufficiently surmised that a pressurization stroke of the second planar pressing means does not stabilize and, consequently, quality including the thickness of a final laminate molded product also does not stabilize. In consideration thereof, an object of the present invention is to provide a control method of a laminate molding system and a laminate molding system capable of favorably performing laminate molding of a laminate molded product. Other problems to be solved and novel features will become apparent from descriptions in the present specification and the accompanying drawings.

A control method of a laminate molding system according to an embodiment is a control method of a laminate molding system in which at least two press apparatuses are consecutively provided and a laminate molded product having been pressure-molded by a press apparatus in a previous step is further pressure-molded by a press apparatus in a subsequent step, wherein a physical quantity during pressure-molding or after pressure-molding by the press apparatus in the previous step is measured and the physical quantity is used to control the press apparatus in the subsequent step.

According to the embodiment, a control method of a laminate molding system and a laminate molding system capable of favorably performing laminate molding of a laminate molded product can be provided.

DESCRIPTION OF EMBODIMENTS

Figure 1:
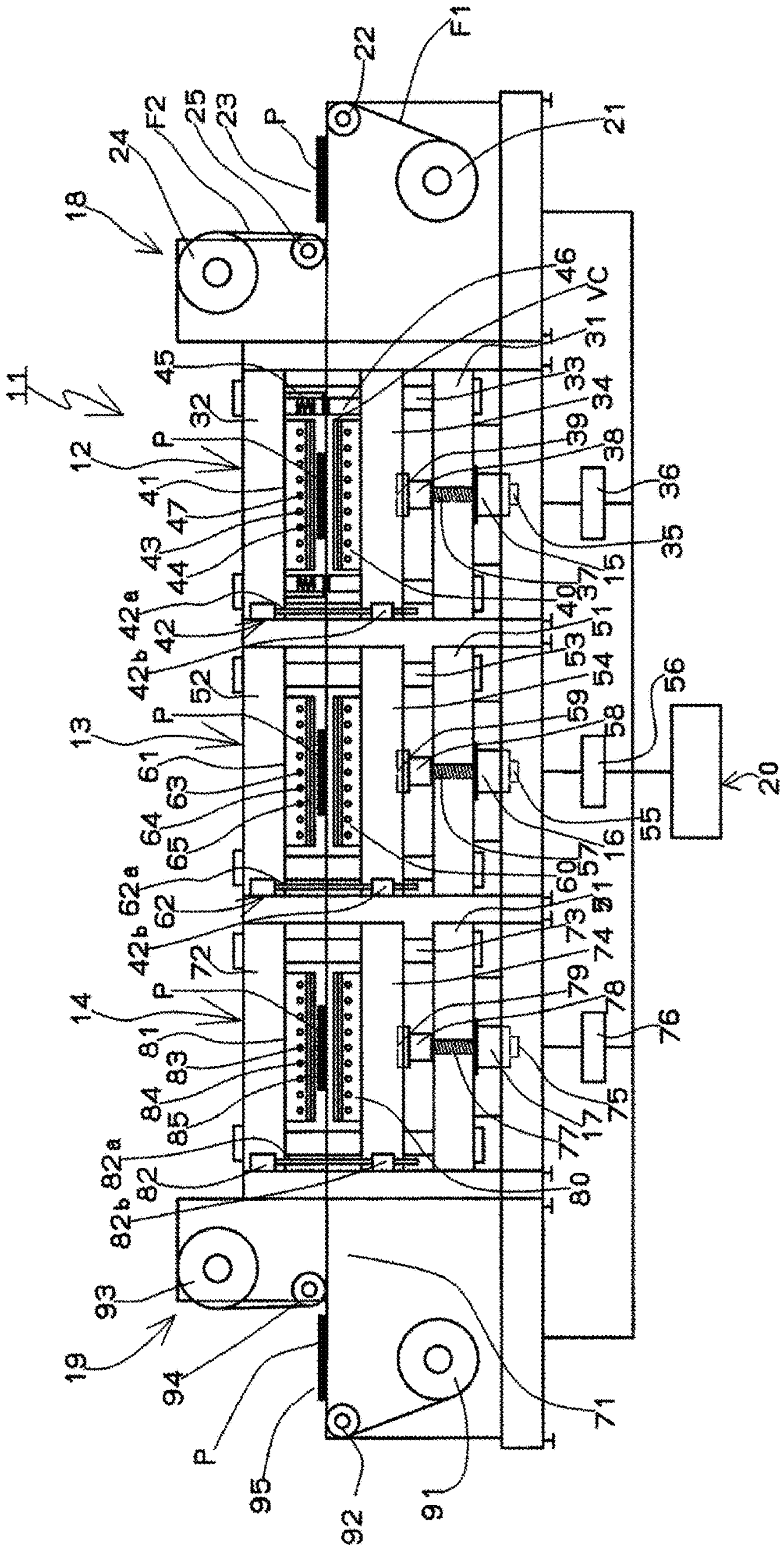
FIG. 1 is a schematic explanatory diagram of a laminate molding system according to a first embodiment.

A laminate molding system 11 according to a first embodiment of the present invention will be described with reference to FIG. 1. The laminate molding system 11 includes a first press apparatus 12 which is equipped with a chamber VC that can be depressurized and which uses a servomotor 15 as a drive source, a second press apparatus 13 which is consecutively provided in a subsequent step to the first press apparatus 12 and which uses a servomotor 16 as a drive source, and a third press apparatus 14 which is consecutively provided in a subsequent step to the second press apparatus 13 and which uses a servomotor 17 as a drive source. Therefore, at least two press apparatuses 12, 13, and 14 are consecutively provided in the present invention.

In addition, the laminate molding system 11 includes a carrier film sending apparatus 18 in a previous step to the first press apparatus 12 and a carrier film winding apparatus 19 in a subsequent step to the third press apparatus 14. The laminate molding system 11 further includes a control apparatus 20. The control apparatus 20 is connected to the first press apparatus 12, the second press apparatus 13, the third press apparatus 14, the carrier film sending apparatus 18, and the carrier film winding apparatus 19 and controls the entire laminate molding system 11. Furthermore, the control apparatus 20 has a function of measuring the thickness of a laminate molded product P using a position sensor upon at least end of pressurization of the press apparatus 12 or 13 in the previous step, storing the thickness in a storage apparatus 106, and using the thickness to control the press apparatus 13 or 14 in the subsequent step. Note that the control apparatus 20 may be provided at a position separated from apparatuses of the laminate molding system 11. As an example, an apparatus portion of the laminate molding system 11 and the control apparatus 20 may be separated by any distance as long as the apparatus portion and the control apparatus 20 are connected by a communication line inside a same building. In addition, the apparatuses of the laminate molding system 11 and the control apparatus may be connected by wireless communication. Furthermore, at least a part of the control apparatus may be shared with the laminate molding system 11 in another area. Alternatively, a manufacturer of the laminate molding system 11 may retain at least a part of the control apparatus 20.

Descriptions will now be given in order from the previous step, starting with a description of the carrier film sending apparatus 18. The carrier film sending apparatus 18 which doubles as a transfer apparatus of a laminate molded product P made up of a substrate with irregularities and a laminate film and a tensioning apparatus of film includes a lower unwinding roll 21 and a driven roll 22. An orientation of a lower carrier film F1 that is unwound from the unwinding roll 21 is changed to a horizontal state in a portion of the driven roll 22. A placement stage part 23 on which is placed the laminate molded product P sent from the previous step in a superimposed state is provided in the portion where the lower carrier film F1 has changed to the horizontal state. In addition, the carrier film sending apparatus 18 includes an upper unwinding roll 24 and a driven roll 25, and an upper carrier film F2 that is unwound from the unwinding roll 24 is superimposed on the laminate molded product P in a portion of the driven roll 25. The laminate molded product P is transferred while being sandwiched by the carrier films F1 and F2. When laminate molding is sequentially performed on the laminate molded product P via the carrier films F1 and F2 in the first press apparatus 12, the second press apparatus 13, and the third press apparatus 14, the carrier films F1 and F2 prevent a portion of the laminate film from melting and adhering to an apparatus portion. Furthermore, the user of the carrier films F1 and F2 is also advantageous in terms of imparting a certain buffering effect when pressurizing the laminate molded product (a primary laminate molded product and a secondary laminate molded product) particularly in the second press apparatus 13 and the third press apparatus 14.

Next, the first press apparatus 12 arranged in the subsequent step to the carrier film sending apparatus 18 will be described. The first press apparatus 12 includes a chamber VC that can be depressurized and a pressurization surface of an elastic body sheet 43 and pressurizes a laminate molded product using drive force generated by the servomotor 15. The first press apparatus 12 pressurizes the laminate molded product P inside the chamber VC that can be depressurized and laminate-molds the laminate molded product P into a primary laminate molded product. The first press apparatus 12 includes four tie bars 33 respectively erected between vicinities of four corners of an approximately rectangular base board 31 provided below and an upper board 32 which is an approximately rectangular fixing plate positioned above the base board 31. In addition, in the first press apparatus 12, a lower board 34 that is an approximately rectangular movable board is capable of ascending and descending between the base board 31 and the upper board 32. The base board 31, the upper board 32, the lower board 34, and intervals of the tie bars 33 of the first press apparatus 12 are often provided so as to be larger than upper boards, lower boards, and the like of the second press apparatus 13 and the third press apparatus 14 in order to provide the chamber VC that can be depressurized. Furthermore, the first press apparatus 12 uses an electric motor such as the servomotor 15 as a drive source and the servomotor 15 that is drive means of a pressurization mechanism is mounted to the base board 31.

With respect to the pressurization mechanism of the first press apparatus 12, the servomotor 15 includes a rotary encoder 35 that is a position sensor, the servomotor 15 is connected to a servo amplifier 36, and the servo amplifier 36 is connected to the control apparatus 20. A ball screw 37 is connected via a reducer (not illustrated) to a drive shaft of the servomotor 15 or the drive shaft itself is directly connected to a ball screw. On the other hand, a ball screw nut 38 of a ball screw mechanism is fixed to a lower surface of the lower board 34 and the ball screw 37 is inserted into the ball screw nut 38. Furthermore, a load cell 39 that is force detecting means is installed between the lower board 34 and the ball screw nut 38. More specifically, the ball screw nut 38 is mounted to the lower board 34 via a bracket so as to enable the ball screw 37 to move upward or a depression into which the ball screw 37 is to be inserted is provided on the lower surface of the lower board 34. When using a bracket, the load cell 39 is installed between the bracket and the ball screw nut 38 or between the bracket and the lower board 34. Note that a portion where the load cell 39 is installed is not limited as long as the portion is capable of receiving pressurization force in a press step and, for example, the portion may be a mounting portion of the servomotor 15. The force detecting means may be a tie bar sensor mounted to the tie bars 33.

Due to the structure described above, in the first press apparatus 12, the lower board 34 is raised and lowered with respect to the upper board 32 due to actuation of the servomotor 15. In the ball screw mechanism of the first press apparatus 12, a belt may span between a pulley mounted to the drive shaft of the servomotor 15 and a pulley mounted to the ball screw 37 and drive force may be transmitted via the belt. Preventing a longitudinal direction of the servomotor 15 from aligning with a serial direction to the ball screw 37 through the use of a belt or the use of a reducer using a worm gear is advantageous in terms of reducing a height of the first press apparatus 12. When comparing the first press apparatus 12 with a metal press or the like, since an ascending and descending stroke of the lower board 34 is relatively short and pressurization time is relatively long, a speed change mechanism such as a reducer or a belt is desirably used in a transmission mechanism of the drive force of the servomotor 15. In addition, between a case of using a reducer and a case of using a belt, using a reducer is often more advantageous in terms of noise, dust generated during use of a belt, and the like. Furthermore, in the ball screw mechanism of the first press apparatus 12, a ball screw nut may be rotatably mounted to the base board 31 and a ball screw may ascend and descent. In addition, covering a portion of the ball screw 37 with a cover prevents diffusion of grease and contributes toward improving cleanliness inside a clean room.

Furthermore, the first press apparatus 12 may use a boost mechanism such as a toggle mechanism, a crank mechanism, or a wedge mechanism or a similar mechanism. In addition, while pressure-molding is performed by a pressurization mechanism using a single servomotor 15 in the first press apparatus 12 in the example described above, the first press apparatus 12 may include a plurality of pressurization mechanisms using a plurality of servomotors 15 such as two, three, or four servomotors 15 and two or more ball screw mechanisms. When there are two servomotors 15 and effective pressurization surfaces of pressurization blocks 40 and 41 are rectangular, two pressurization mechanisms are desirably provided along a center line that is parallel to a long side of the rectangle. In addition, when there are four servomotors 15, four pressurization mechanisms are desirably provided in portions of the tie bars 33 or along a diagonal of the rectangular base board 31 inside the tie bars 33. Furthermore, besides the servomotor 15, a motor such as a linear motor that enables closed-loop control may be used. Moreover, the pressurization mechanism may use a hydraulic cylinder. In addition, the first press apparatus 12 may be configured so that the upper board 32 is raised and lowered with respect to the lower board 34 using the pressurization mechanism described above.

A position sensor such as a linear scale 42 is mounted between a side surface of the upper board 32 and a side surface of the lower board 34 separately from the rotary encoder 35 of the servomotor 15. Of the linear scale 42, a scale 42*a* is mounted to one of the boards and a slider 42*b* that is a measuring unit is mounted to the other board. A position (distance) of the lower board 34 with respect to the upper board 32 can also be detected by the rotary encoder 35 of the servomotor 15. However, a slight backlash is present between the ball screw 37 and the ball screw nut 38 and thermal expansion occurs in the tie bars 33 and the ball screw 37. Therefore, there are often cases where it is more desirable to directly measure any of a distance between the pressurization blocks 40 and 41, a position of the lower board 34 relative to the upper board 32 (a distance between tables), and a distance between the base board 31 and the lower board 34 using the linear scale 42. For example, a resolution of the position sensor such as the linear scale 42 is desirably 0.002 mm or less and more desirably 0.001 mm or less and equal to or more than a minimum resolution put to practical use such as a resolution of 0.0001 mm or a resolution of 0.000025 mm.

While there may be only one position sensor such as the linear scale 42 mounted to the first press apparatus 12, a total of two position sensors may be mounted with one position sensor mounted to each of both side surfaces of the upper board 32 and the lower board 34 with respect to a travel direction of the carrier films F1 and F2 or a total of four position sensors may be mounted with two position sensor mounted to each of both side surfaces of the upper board 32 and the lower board 34 with respect to a travel direction of the carrier films F1 and F2. When two pressurization mechanisms are provided along the travel direction of the carrier films F1 and F2, one position sensor is provided so as to correspond to the position of one pressurization mechanism on the side surface that is parallel to the travel direction of the carrier films F1 and F2. In addition, another position sensor is provided so as to correspond to the other pressurization mechanism on the other side surface that is parallel to the travel direction of the carrier films F1 and F2. When a total of four position sensors are to be mounted to both side surfaces and four servomotors are to be provided, controlling each servomotor by each position sensor enables parallelism of the lower board 34 with respect to the upper board 32 to be detected and enables the lower board 34 to be controlled so as to become parallel to the upper board 32. Alternatively, the position where the position sensor is provided may be a position where the pressurization block 40 and the pressurization block 41 are connected to each other or a position where the base board 31 and the lower board 34 are connected to each other. Furthermore, the first press apparatus 12 generally includes a safety switch capable of detecting a position such as a limit switch or a proximity switch (not illustrated) for the purpose of preventing the position of the lower board 34 from exceeding a descending limit or an ascending limit in terms of machine design.

The pressurization block 40 and the pressurization block 41 are respectively mounted via a heat insulation plate (not illustrated) to each of the opposing surfaces of the upper board 32 and the lower board 34 of the first press apparatus 12. Since structures of the pressurization blocks 40 and 41 are substantially the same, the one pressurization block 40 will be described. Temperature control means such as a cartridge heater 47 is provided inside the pressurization block 40 or a rubber heater or the like is provided on a surface of the pressurization block 40. An elastic body sheet 43 made of a heat-resistant rubber film is pasted on the surface of the pressurization block 40 and a thin metal plate 44 is mounted to the surface of the pressurization block 40. The elastic body sheet 43 is made of a heat-resistant rubber such as silicone rubber or fluoro-rubber and a thickness thereof ranges from 0.2 mm to 5.0 mm. In addition, the elastic body sheet 43 constitutes the pressurization surface.

Next, a configuration of the chamber VC that can be depressurized of the first press apparatus 12 will be described. An upper outer frame part 45 for constituting a part of the chamber VC is mounted so as to face downward in a peripheral portion of a portion where the pressurization block 41 is mounted in the upper board 32. In addition, a lower outer frame part 46 for constituting a part of the chamber VC is mounted so as to face upward in a peripheral portion of a portion where the pressurization block 40 is mounted in the lower board 34. Furthermore, the chamber VC can be internally formed when an abutting surface of the outer frame part 45 and an abutting surface of the outer frame part 46 abut with each other. A height of at least one outer frame part 45 or the like can be changed due to the use of an elastic body such as a spring or rubber. A sealing member such as an O-ring is mounted to the abutting surface of at least one outer frame part 46 or the like. Furthermore, a member that forms the chamber VC may be other means such as a rubber bellows. Moreover, instead of having the chamber VC being constructed by driving by the servomotor 15 of the pressurization mechanism, an actuation mechanism of the member constituting the chamber VC may be constituted of a different mechanism from the pressurization mechanism of the laminate molded product P. The chamber VC of the first press apparatus 12 is connected to a vacuum pump (not illustrated) via a conduit and the chamber VC in a vacuum state can be formed by sucking air inside the chamber VC. Therefore, the first press apparatus 12 constitutes a vacuum laminating apparatus. A degree of vacuum of the chamber VC in a state where the chamber VC can be depressurized in the present invention is not limited.

Next, the second press apparatus 13 that is consecutively arranged in a serial direction in the subsequent step to the first press apparatus 12 will be described. The second press apparatus 13 includes a pressurization surface of a metal press plate 65 and pressurizes the laminate molded product P using drive force generated by the servomotor 16. The second press apparatus 13 further pressurizes the laminate molded product P (first laminate molded product) which has been pressure-molded by the first press apparatus 12, which is made up of a substrate with irregularities and a laminate film, and which is in a state where irregularities remain on a side of the laminate film to pressure-mold a flatter laminate molded product P (second laminate molded product). The second press apparatus 13 includes four tie bars 53 respectively erected between vicinities of four corners of an approximately rectangular base board 51 provided below and an upper board 52 which is an approximately rectangular fixing plate positioned above the base board 51. In addition, in the second press apparatus 13, a lower board 54 that is an approximately rectangular movable board is capable of ascending and descending between the base board 51 and the upper board 52. Furthermore, the second press apparatus 13 uses an electric motor such as the servomotor 16 as a drive source and the servomotor 16 that is drive means of a pressurization mechanism is mounted to the base board 51.

With respect to the pressurization mechanism of the second press apparatus 13, the servomotor 16 includes a rotary encoder 55 and is connected to a servo amplifier 56, and the servo amplifier 56 is connected to the control apparatus 20. A ball screw 57 is connected via a reducer (not illustrated) to a drive shaft of the servomotor 16 or the drive shaft itself is directly connected to the ball screw 57. On the other hand, a ball screw nut 58 of a ball screw mechanism is fixed to a lower surface of the lower board 54 and the ball screw 57 is inserted into the ball screw nut 58. Furthermore, a load cell 59 that is force detecting means is installed between the lower board 54 and the ball screw nut 58. More specifically, the ball screw nut 58 is mounted to the lower board 54 via a bracket so as to enable the ball screw 57 to move upward or a depression into which the ball screw 57 is to be inserted is provided on the lower surface of the lower board 54. When using a bracket, the load cell 59 is installed between the bracket and the ball screw nut 58 or between the bracket and the lower board 54. Note that a portion where the load cell 59 is installed is not limited as long as the portion is capable of receiving pressurization force in a press step and, for example, the portion may be a mounting portion of the servomotor 16. The force detecting means may be a tie bar sensor mounted to the tie bars 53.

Due to the structure described above, in the second press apparatus 13, the lower board 54 is raised and lowered with respect to the upper board 52 due to actuation of the servomotor 16. In the ball screw mechanism of the second press apparatus 13, a belt may span between a pulley mounted to the drive shaft of the servomotor 16 and a pulley mounted to the ball screw 57 and drive force may be transmitted via the belt. Preventing a longitudinal direction of the servomotor 16 from aligning with a serial direction to the ball screw 57 through the use of a belt or the use of a reducer using a worm gear is advantageous in terms of reducing a height of the second press apparatus 13. When comparing the second press apparatus 13 with a metal press or the like, since an ascending and descending stroke of the lower board 54 is relatively short and pressurization time is relatively long, a speed change mechanism such as a reducer or a belt is desirably used in a transmission mechanism of the drive force of the servomotor 16. In addition, between a case of using a reducer and a case of using a belt, using a reducer is often more advantageous in terms of noise, dust generated during use of a belt, and the like. Furthermore, in the ball screw mechanism of the second press apparatus 13, a ball screw nut may be rotatably mounted to the base board 51 and a ball screw may ascend and descent. In addition, covering a portion of the ball screw 57 with a cover prevents diffusion of grease and contributes toward improving cleanliness inside a clean room. Furthermore, the second press apparatus 13 may use a boost mechanism such as a toggle mechanism, a crank mechanism, or a wedge mechanism or a similar mechanism. In addition, while pressure-molding is performed by a pressurization mechanism using a single servomotor 16 in the second press apparatus 13 in the example described above, the second press apparatus 13 may include a pressurization mechanism using two or more servomotors 16 such as two, three, or four servomotors 16 and two or more ball screw mechanisms. Furthermore, besides the servomotor, a motor such as a linear motor that enables closed-loop control may be used. Moreover, the pressurization mechanism may use a hydraulic cylinder. In addition, the second press apparatus 13 may be configured so that the upper board 52 is raised and lowered with respect to the lower board 54 using the pressurization mechanism described above.

A linear scale 62 that is a position sensor is mounted between a side surface of the upper board 52 and a side surface of the lower board 54 separately from the rotary encoder 55 of the servomotor 16. Of the linear scale 62, a scale 62*a* is mounted to one of the boards and a slider 62*b* that is a measuring unit is mounted to the other board. A position (distance) of the lower board 54 with respect to the upper board 52 can also be detected by the rotary encoder 55 of the servomotor 16. However, a slight backlash is present between the ball screw 57 and the ball screw nut 58 and thermal expansion occurs in the tie bars 53 and the ball screw 57. Therefore, there are often cases where it is more desirable to directly measure any of a distance between the pressurization blocks 60 and 61, a position of the lower board 54 relative to the upper board 52 (a distance between tables), and a distance between the base board 51 and the lower board 54 using the linear scale 62. For example, a resolution of the position sensor such as the linear scale 62 is desirably 0.002 mm or less and more desirably 0.001 mm or less and equal to or more than a minimum resolution put to practical use such as a resolution of 0.0001 mm or a resolution of 0.000025 mm.

While there may be only one position sensor such as the linear scale 62 mounted to the second press apparatus 13, a total of two position sensors may be mounted with one position sensor mounted to each of both side surfaces of the upper board 52 and the lower board 54 with respect to a travel direction of the carrier films F1 and F2 or a total of four position sensors may be mounted with two position sensor mounted to each of both side surfaces of the upper board 52 and the lower board 54 with respect to a travel direction of the carrier films F1 and F2. By mounting a total of four position sensors to both side surfaces and providing four servomotors and controlling each servomotor by each position sensor, parallelism of the lower board 54 with respect to the upper board 52 can be detected and the lower board 54 can be controlled so as to become parallel to the upper board 52. Alternatively, the position where the position sensor is provided may be a position where the pressurization block 60 and the pressurization block 61 are connected to each other or a position where the base board 51 and the lower board 54 are connected to each other. Furthermore, the second press apparatus 13 generally includes a safety switch capable of detecting a position such as a limit switch or a proximity switch (not illustrated) for the purpose of preventing the position of the lower board 34 from exceeding a descending limit or an ascending limit in terms of machine design.

The pressurization blocks 60 and 61 are respectively mounted via a heat insulation plate (not illustrated) to each of the opposing surfaces of the upper board 52 and the lower board 54 of the second press apparatus 13. Since structures of the pressurization blocks 60 and 61 are substantially the same, the one pressurization block 60 will be described. Temperature control means such as a cartridge heater 63 is provided inside the pressurization block 60 or a rubber heater or the like is provided on a surface of the pressurization block 40. A buffer material 64 such as rubber, a resin film, or a fiber sheet is mounted to the surface of the pressurization block 60. For example, a thickness of the buffer material 64 ranges from 0.05 mm to 3.00 mm. In addition, the metal press plate 65 made of a material such as elastically deformable stainless steel with a thickness of, for example, 0.2 mm to 3.00 mm is mounted to a surface of the buffer material 64. Furthermore, a surface of the metal press plate 65 on an opposite side to the surface in contact with the buffer material 64 is a pressurization surface.

A member constituting the pressurization surface of the second press apparatus 13 may be an elastic body sheet with heat resistance such as silicone rubber or a fluoro-rubber sheet. In this case, while the elastic body sheet used is not limited to a particular hardness (Shore A Hardness), for example, an elastic body sheet with a hardness that ranges from 30 to 80 and more preferably from 40 to 70 is used. In addition, while the second press apparatus 13 in FIG. 1 does not include a chamber that can assume a vacuum state, the second press apparatus 13 may include a chamber that can assume a vacuum state and enable pressure-molding to be performed inside the vacuum chamber in a similar manner to the first press apparatus 12.

Next, the third press apparatus 14 that is consecutively arranged in a serial direction in the subsequent step to the second press apparatus 13 will be described. The third press apparatus 14 includes a pressurization surface of a metal press plate 85 and pressurizes the laminate molded product P using drive force generated by the servomotor 17. The third press apparatus 14 further pressurizes the laminate molded product P (second laminate molded product) which has been pressure-molded by the second press apparatus 13 and which is in a state where a small amount of irregularities remains on a side of the laminate film or a state of being already flattened to pressure-mold a final laminate molded product P (third laminate molded product) of which a flatness is within an allowable range. A configuration of the third press apparatus 14 is basically the same as that of the second press apparatus 13. The third press apparatus 14 includes four tie bars 73 respectively erected between vicinities of four corners of an approximately rectangular base board 71 provided below and an upper board 72 which is an approximately rectangular fixing plate positioned above the base board 71. In addition, in the third press apparatus 14, a lower board 74 that is an approximately rectangular movable board is capable of ascending and descending between the base board 71 and the upper board 72. Furthermore, the third press apparatus 14 uses an electric motor such as the servomotor 17 as a drive source and the servomotor 17 that is drive means of a pressurization mechanism is mounted to the base board 71.

With respect to the pressurization mechanism of the third press apparatus 14, the servomotor 17 includes a rotary encoder 75 and is connected to a servo amplifier 76, and the servo amplifier 76 is connected to the control apparatus 20. A ball screw 77 is connected via a reducer (not illustrated) to a drive shaft of the servomotor 17 or the drive shaft itself is directly connected to the ball screw 77. On the other hand, a ball screw nut 78 of a ball screw mechanism is fixed to a lower surface of the lower board 54 and the ball screw 77 is inserted into the ball screw nut 78. Furthermore, a load cell 79 that is force detecting means is installed between the lower board 74 and the ball screw nut 78. More specifically, the ball screw nut 78 is mounted to the lower board 74 via a bracket so as to enable the ball screw 77 to move upward or a depression into which the ball screw 77 is to be inserted is provided on the lower board 74. When using a bracket, the load cell 79 is installed between the bracket and the ball screw nut 78 or between the bracket and the lower board 74. Note that a portion where the load cell 79 is installed is not limited as long as the portion is capable of receiving pressurization force in a press step and, for example, the portion may be a mounting portion of the servomotor 17. The force detecting means may be a tie bar sensor mounted to the tie bars 73.

Due to the structure described above, in the third press apparatus 14, the lower board 74 is raised and lowered with respect to the upper board 72 due to actuation of the servomotor 17. In the ball screw mechanism of the third press apparatus 14, a belt may span between a pulley mounted to the drive shaft of the servomotor 17 and a pulley mounted to the ball screw 77 and drive force may be transmitted via the belt. Preventing a longitudinal direction of the servomotor 17 from aligning with a serial direction to the ball screw 57 through the use of a belt or the use of a reducer using a worm gear is advantageous in terms of reducing a height of the third press apparatus 14. When comparing the third press apparatus 14 with a metal press or the like, since an ascending and descending stroke of the lower board 74 is relatively short and pressurization time is relatively long, a speed change mechanism such as a reducer or a belt is desirably used in a transmission mechanism of the drive force of the servomotor 17. In addition, between a case of using a reducer and a case of using a belt, using a reducer is often more advantageous in terms of noise, dust generated during use of a belt, and the like. Furthermore, in the ball screw mechanism of the third press apparatus 14, a ball screw nut may be rotatably mounted to the base board 71 and a ball screw may ascend and descent. In addition, covering a portion of the ball screw 77 with a cover prevents diffusion of grease and contributes toward improving cleanliness inside a clean room. Furthermore, the third press apparatus 14 may use a boost mechanism such as a toggle mechanism, a crank mechanism, or a wedge mechanism or a similar mechanism. In addition, while pressure-molding is performed by a pressurization mechanism using a single servomotor 17 in the third press apparatus 14 in the example described above, the third press apparatus 14 may include a pressurization mechanism using two or more servomotors 17 such as two, three, or four servomotors 17 and two or more ball screw mechanisms such as two, three, or four ball screw mechanisms. Furthermore, besides the servomotor, a motor such as a linear motor that enables closed-loop control may be used. Moreover, the pressurization mechanism may use a hydraulic cylinder. In addition, the third press apparatus 14 may be configured so that the upper board 72 is raised and lowered with respect to the lower board 74 using the pressurization mechanism described above.

A linear scale 82 that is a position sensor is mounted between a side surface of the upper board 72 and a side surface of the lower board 74 separately from the rotary encoder 75 of the servomotor 17. Of the linear scale 82, a scale 82*a* is mounted to one of the boards and a slider 82*b* that is a measuring unit is mounted to the other board. A position (distance) of the lower board 74 with respect to the upper board 72 can also be detected by the rotary encoder 75 of the servomotor 17. However, a slight backlash is present between the ball screw 77 and the ball screw nut 78 and thermal expansion occurs in the tie bars 73 and the ball screw 77. Therefore, there are often cases where it is more desirable to directly measure any of a distance between the pressurization blocks 80 and 81, a position of the lower board 74 relative to the upper board 72 (a distance between tables), and a distance between the base board 71 and the lower board 74 using the linear scale 82. For example, a resolution of the position sensor such as the linear scale 82 is desirably 0.002 mm or less and more desirably 0.001 mm or less and equal to or more than a minimum resolution put to practical use such as a resolution of 0.0001 mm or a resolution of 0.000025 mm.

While there may be only one position sensor such as the linear scale 82 mounted to the third press apparatus 14, a total of two position sensors may be mounted with one position sensor mounted to each of both side surfaces of the upper board 72 and the lower board 74 with respect to a travel direction of the carrier films F1 and F2 or a total of four position sensors may be mounted with two position sensors mounted to each of both side surfaces of the upper board 72 and the lower board 74 with respect to a travel direction of the carrier films F1 and F2. When mounting a total of four position sensors to both side surfaces and providing four servomotors, controlling each servomotor by each position sensor enables parallelism of the lower board 74 with respect to the upper board 72 to be detected and the lower board 74 to be controlled so as to become parallel to the upper board 72. Alternatively, the position where the position sensor is provided may be a position where the pressurization block 80 and the pressurization block 81 are connected to each other or a position where the base board 71 and the lower board 74 are connected to each other. Furthermore, the third press apparatus 14 generally includes a safety switch capable of detecting a position such as a limit switch or a proximity switch (not illustrated) for the purpose of preventing the position of the lower board 74 from exceeding a descending limit or an ascending limit in terms of machine design.

The pressurization blocks 80 and 81 are respectively mounted via a heat insulation plate (not illustrated) to each of the opposing surfaces of the upper board 72 and the lower board 74 of the third press apparatus 14. Since structures of the pressurization blocks 80 and 81 are substantially the same, the one pressurization block 80 will be described. Temperature control means such as a cartridge heater 83 is provided inside the pressurization block 80 or a rubber heater or the like is provided on a surface of the pressurization block 40. A buffer material 84 such as rubber, a resin film, or a fiber sheet is mounted to the surface of the pressurization block 80. For example, a thickness of the buffer material 84 ranges from 0.05 mm to 3.00 mm. In addition, the metal press plate 85 made of a material such as elastically deformable stainless steel with a thickness of, for example, 0.2 mm to 3.00 mm is mounted to a surface of the buffer material 84. Furthermore, a surface of the metal press plate 85 on an opposite side to the surface in contact with the buffer material 84 is a pressurization surface.

A member constituting the pressurization surface of the third press apparatus 14 may be an elastic body sheet with heat resistance such as silicone rubber or a fluoro-rubber sheet. In this case, while the elastic body sheet used is not limited to a particular hardness (Shore A Hardness), for example, an elastic body sheet with a hardness that ranges from 30 to 80 and more preferably from 40 to 70 is used. In addition, while the third press apparatus 14 in FIG. 1 does not include a chamber that can assume a vacuum state, the third press apparatus 14 may include a chamber that can assume a vacuum state and enable pressure-molding to be performed inside the vacuum chamber in a similar manner to the first press apparatus 12.

Next, the carrier film winding apparatus 19 provided in the subsequent step to the third press apparatus 14 will be described. The carrier film winding apparatus 19 doubles as a transfer apparatus and a tensioning apparatus of the carrier films F1 and F2. The carrier film winding apparatus 19 includes a lower winding roll 91 and a driven roll 92 and the lower carrier film F1 is wound by the winding roll 91. In addition, the carrier film winding apparatus 19 includes an upper winding roll 93 and a driven roll 94 and the upper carrier film F2 is peeled off from the laminate molded product P that is a final molded product in the portion of the driven roll 94 and the upper carrier film F2 is wound by the upper winding roll 93. Furthermore, an extraction stage part 95 of the laminate molded product P is provided in a portion where only the lower carrier film F1 is sent in the horizontal state. As the transfer apparatus of the carrier films F1 and F2, a transfer apparatus (a so-called chuck apparatus) which grasps both sides of the carrier films F1 and F2 and pulls the carrier films F1 and F2 toward the subsequent step may be provided.

Figure 2:
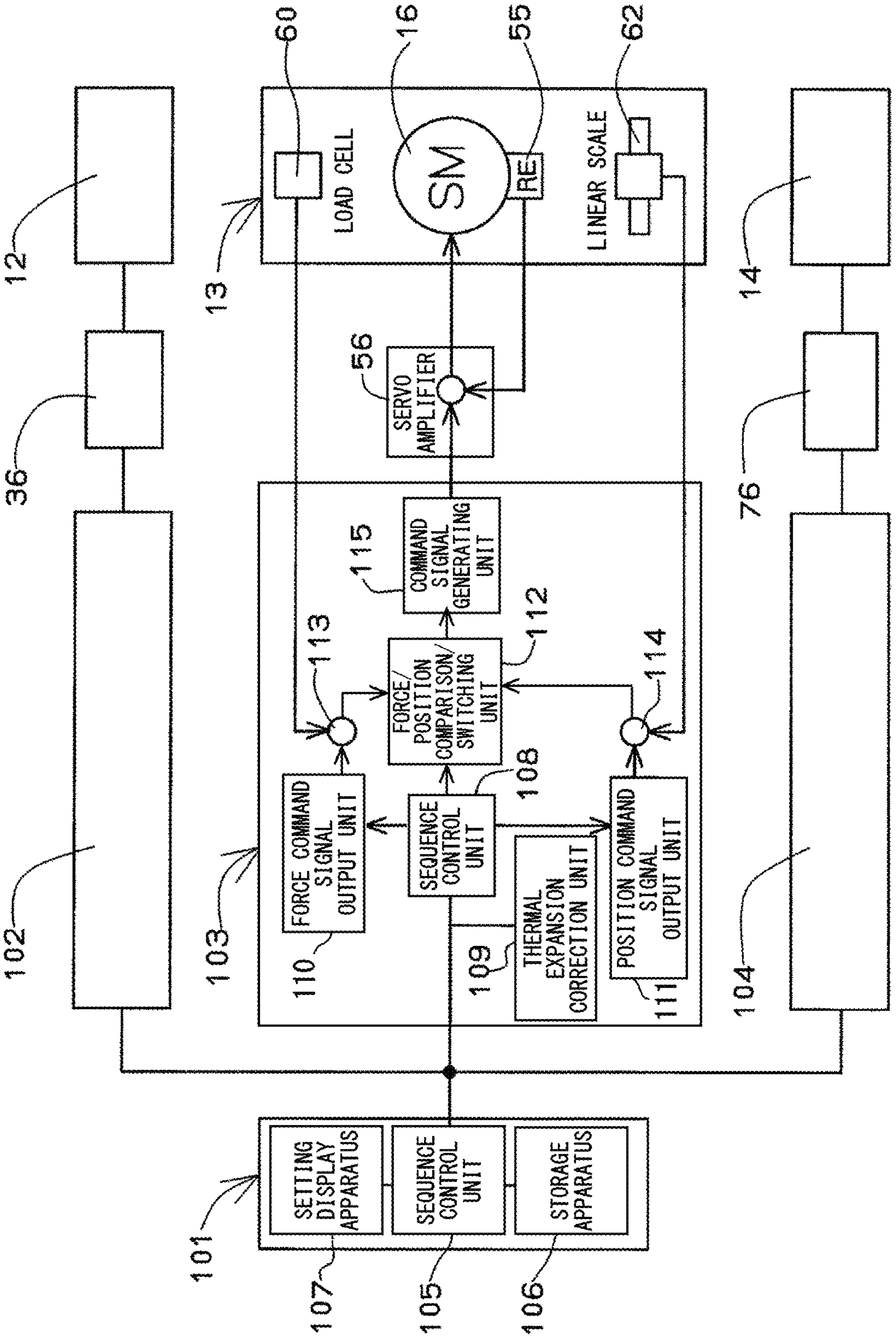
FIG. 2 is a block diagram of a control apparatus of the laminate molding system according to the first embodiment.

Next, a block diagram of the control apparatus 20 of the laminate molding system 11 will be described with reference to FIG. 2. The control apparatus 20 includes an integrated control unit 101, a first press apparatus control unit 102, a second press apparatus control unit 103, and a third press apparatus control unit 104. While functional blocks will be described in an easily understood manner, functions of the integrated control unit 101 may be included in a distributed manner in each of the press apparatus control units 102, 103, and 104 provided in each of the press apparatuses 12, 13, and 14 or functions of each press apparatus control unit may be provided at one location together with the integrated control unit 101 instead of being provided in each of the press apparatuses 12, 13, and 14.

The integrated control unit 101 is provided with a sequence control unit 105 that is responsible for sequence control of the entire laminate molding system 11 including a conveyance mechanism made up of the carrier film sending apparatus 18 and the carrier film winding apparatus 19 in addition to the respective press apparatuses 12, 13, and 14. In addition, the storage apparatus 106 being connected to the sequence control unit 105 is provided. The storage apparatus 106 stores various molding conditions and actual measurement data obtained during molding. In relation to the present invention, the storage apparatus 106 is provided so that thickness of the laminate molded product P is measured using a position sensor upon at least completion of pressurization of the press apparatus in the previous step, the thickness is stored in the storage apparatus 106, and the thickness is used to control the press apparatus in the subsequent step. Furthermore, the integrated control unit 101 is provided with a setting display apparatus 107.

Since the first press apparatus control unit 102, the second press apparatus control unit 103, and the third press apparatus control unit 104 more or less share the same content, the second press apparatus control unit 103 that controls the second press apparatus 13 will be described. The second press apparatus control unit 103 is provided with a sequence control unit 108 and the sequence control unit 108 is connected to a thermal expansion correction unit 109 for correcting a control value in correspondence to thermal expansion of the press apparatus. Furthermore, the sequence control unit 108 is connected to a force command signal output unit 110 and a position command signal output unit 111. In addition, while the force command signal output unit 110 is connected to a force/position comparison/switching unit 112, an adder 113 is provided midway along a connection line thereto, the adder 113 is connected to the load cell 59, and force command signals are subjected to addition and subtraction. On the other hand, while the position command signal output unit 111 is also connected to the force/position comparison/switching unit 112, an adder 114 is provided midway along a connection line thereto, the adder 114 is connected to the linear scale 62, and position command signals are subjected to addition and subtraction. Furthermore, the force/position comparison/switching unit 112 is connected to a command signal generating unit 115 and command signals to be sent to the servo amplifier 56 are generated by the command signal generating unit 115.

The second press apparatus 13 also includes the servomotor 16 that is drive means and the rotary encoder 55. The servomotor 16 is connected to the servo amplifier 56 and power for driving the servomotor 16 is supplied from the servo amplifier 56. The rotary encoder 55 is also connected to the servo amplifier 56 and a rotational angle (number of pulses) of the servomotor 16 is detected by the rotary encoder 55 and sent to the servo amplifier 56 to be fed back to an adder (not illustrated) inside the servo amplifier 56 to be collated with a position command pulse. Note that the control block of the first press apparatus 12 includes a function of depressurizing the chamber VC in addition to functions of the control block of the second press apparatus 13.

Next, a laminate molding method of the laminate molded product P using the laminate molding system 11 according to the first embodiment will be described with reference to FIGS. 3 to 6. Before starting laminate molding in the laminate molding system 11, first, origin setting of the linear scales 42, 62, and 82 that are position sensors of the first press apparatus 12, the second press apparatus 13, and the third press apparatus 14 is performed. Origin setting is performed by a press control unit using at least signals from the rotary encoders 55 and 75 of the servomotors 16 and 17 of the second press apparatus 13 and the third press apparatus 14. While the second press apparatus 13 will be described as an example, origin setting of the other press apparatuses 12 and 14 is performed in a similar manner. First, the servomotor 16 is actuated in a state where only the carrier films F1 and F2 are present between the pressurization blocks 60 and 61. The lower board 54 and the pressurization block 60 ascend and a position at a time point where the pressurization block 60 comes into contact with the carrier films F1 and F2 and the load cell 59 assumes a predetermined value or a torque of the servomotor 16 assumes a predetermined value is stored in the storage apparatus 106 or a storage apparatus (not illustrated) of the second press apparatus 13 as an origin (control origin) of the linear scale 62 and an origin (control origin) of the rotary encoder 55. In doing so, detection and storage of the origin position may be performed by sandwiching a dummy substrate with enough stiffness to not deform under pressure between the carrier films F1 and F2. Alternatively, when a mechanism for removing backlash between the ball screw 57 and the ball screw nut 58 or the like by a spring or the like is provided, detection and storage of the origin position may be performed at a mold-open position where the lower board 34 has descended to a lowermost stage. While a timing of detection and storage of the origin position of the laminate molding system 11 desirably coincides with replacing the buffer material 64, the metal press plate 65, a heat insulation plate (not illustrated), or the like, detection and storage of the origin position may be performed at every predetermined shot or when a type of the laminate molded product A is exchanged.

In the laminate molding system 11 during consecutive molding, due to sequence control by the control apparatus 20, laminate molding is simultaneously performed in the first press apparatus 12, the second press apparatus 13, and the third press apparatus 14 in a manner similar to batch processing. However, a description will now be given along an order of molding one batch's worth of the same laminate molded products.

A material to be laminated of the laminate molded product P which is placed on the placement stage part 23 of the carrier film sending apparatus 18 is a circuit board for buildup including a concave-convex part made up of a convex part that is a copper foil portion bonded to the surface of the substrate and a concave part that is a portion without copper foil. A thickness (a height relative to a substrate portion) of the copper foil ranges, but not limited to, from several μm to around several tens of μm and is 0.1 mm or less in most cases. A laminate film is respectively superimposed above and below the circuit board to construct a laminate molded product for buildup molding. In addition, the laminate film of the laminate molded product P is an interlayer insulator film containing a thermoset resin as a principal component and, as an example, the laminate film contains 35 to 75 percent by weight of $SiO_2$ that is an inorganic substance and fluidity when the laminate film assumes a molten state is set lower than a case where only resin is used. The laminate film is superimposed on at least one of an upper side and a lower side of the circuit board and, in the present embodiment, the laminate film is superimposed on both sides. Although one laminate molded product P is shown in FIG. 1, a plurality of the laminate molded products P may be simultaneously placed on the placement stage part 23 to be laminate-molded.

The laminate molded product P placed on the placement stage part 23 is moved together with the upper and lower carrier films F1 and F2 with rotational drive by the winding rolls 91 and 93 and sent to and positioned inside the chamber VC of the first press apparatus 12 in an open state. Next, a first press step by the first press apparatus 12 is started. The first press step by the first press apparatus 12 will be described using the graph shown in FIG. 3. When a cycle of the first press step is started, the lower board 34 ascends due to drive of the servomotor 15 of the pressurization mechanism, the abutting surface of the outer frame part 45 and the abutting surface of the outer frame part 46 abut with each other via the carrier films F1 and F2, and the chamber VC is formed. Subsequently, depressurization is performed by a vacuum pump (not illustrated) to form the chamber VC in a vacuum state (depressurized state).

By further driving the servomotor 15, the outer frame part 45 contracts and the upper surface of the laminate molded product P abuts with a pressurization surface made of the elastic body sheet 43 of the pressurization block 41 that is fixed to the upper board 32. At this time point, pressurization is started in a portion of contact of the molded product (initial molded product thickness) shown on a left side in FIG. 3. In the first press step, closed loop control due to force control is performed by detecting a value of the load cell 39 and driving the servomotor 15. More specifically, a value of the load cell 39 is added to or subtracted from a force command signal sent from the force command signal output unit 110 by the adder 113, a command signal is generated by the command signal generating unit 115 via the force/position comparison/switching unit 112, and the command signal is transmitted to the servo amplifier 56. The pressurization force (pressure (surface pressure) per unit area that is applied to the laminate molded product) in doing so ranges from, for example, 0.3 MPa to 3.0 MPa. While force control is performed in terms of control of the servomotor 15, pressure (surface pressure) is shown in a display screen and the like for better understanding. Once the load cell 39 detects that the pressurization force has reached predetermined molding pressure having been set, compression is completed and closed loop control is performed so as to maintain the predetermined pressure.

Figure 3:
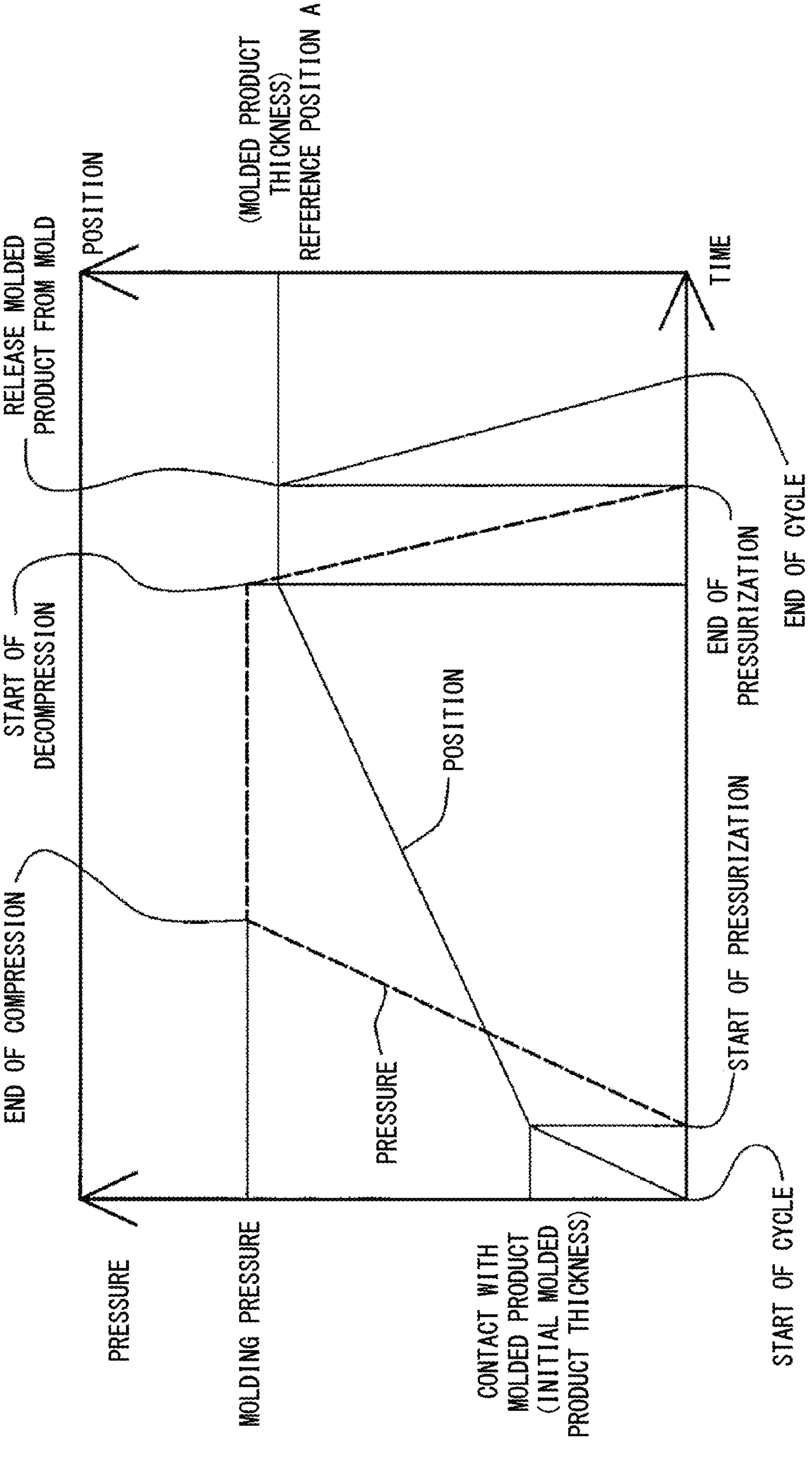
FIG. 3 is a graph showing a relationship between pressure and position in a first press step by a first press apparatus and a second press step by a second press apparatus.

While position control is not performed during the closed loop control, a distance between the pressurization blocks 40 and 41 gradually decreases as shown in FIG. 3. In other words, the thickness of the laminate molded product P gradually decreases. In addition, while a temperature of the pressurization blocks 40 and 41 of the first press apparatus 12 at this time varies depending on a material of the laminate molded product, temperature control is performed to 50° C. to 200° C. and more preferably to 80° C. to 150° C. Since the pressurization surfaces on both upper and lower sides in the first press apparatus 12 are the elastic body sheet 43 with the hardness and the thickness described above, a situation where only a portion of the convex part of the substrate is strongly pressed is suppressed and the laminate molded product P (primary laminate molded product) is laminate-molded by performing adhesion of the substrate and the laminate film in a state where the laminate film is embedded in the concave part of the substrate. However, irregularities that conform to a shape of the concave-convex part of the substrate still remain on the surface of the laminate film of the laminate molded product P (primary laminate molded product) having been laminate-molded by the first press apparatus 12.

Once a predetermined amount of time elapses, pressurization force control is ended and decompression is started. A time point where pressurization ends and pressurization force becomes 0 is a point where, as shown in FIG. 3, the molded product is released from the mold and a thickness of the final molded product is reached. From this point, the servomotor 15 is driven in an opposite direction to lower the lower board 34 and the pressurization block 40. Introduction of air into the chamber VC in the depressurized state may be started at the time point where decompression is started, the time point where pressurization is ended, or halfway between the two time points. Once the inside of the chamber VC reaches atmospheric pressure, the lower board 34 descends due to drive of the servomotor 15 and mold release of the laminate molded product P (primary laminate molded product) having been abutted against the respective pressurization surfaces of the pressurization blocks 40 and 41 via the carrier films F1 and F2 is performed. The chamber VC is opened after the inside of the chamber VC assumes an atmospheric pressure state. In addition, due to feeding of the carrier films F1 and F2 by the carrier film winding apparatus 19, the laminate molded product P (primary laminate molded product) is further conveyed to between the upper board 52 and the lower board 54 of the second press apparatus 13 in the subsequent step and stops at a predetermined pressurization position.

While only force control is performed in the first press step by the first press apparatus 12 in the present embodiment, at least force control may be performed in the first press step. In other words, position control (including speed control) may be concomitantly used from the beginning, after a predetermined amount of time elapses, or after reaching a predetermined position. When driving means of the first press apparatus 12 is a hydraulic cylinder, portions of force control are replaced with pressure control. When only force control (pressure control) is performed or when control including elements of force control (pressure control) is performed in the first embodiment, the thickness of the laminate molded product P (primary laminate molded product) after pressure-molding ends is not completely controlled to a same thickness. Although not essential to the first press apparatus 12 in the present invention, the thickness of the laminate molded product P (primary laminate molded product) may be measured by the linear scale 42 upon the end of pressure-molding by the first press apparatus 12. In addition, when the thickness of the laminate molded product P is measured, the measured value is used in control by the second press apparatus 13 that is the press apparatus in the subsequent step.

Note that the measurement of the thickness of the laminate molded product P upon the end of pressure-molding by the first press apparatus 12 corresponds to the measurement of a physical quantity during pressure-molding or upon end of pressure-molding by the press apparatus according to the present invention. Alternatively, the physical quantity measured by a sensor in the first press apparatus 12 may be a force measured by a load cell (sensor) or pressure detected by a pressure sensor. In other words, when performing control that prioritizes position control in a latter half or at least at the end of the first press apparatus 12, the detected force (pressure) may not be a constant value. In such a case, a force (pressure) as a physical quantity may be detected and used in control of the second press apparatus 13 in the subsequent step.

Figure 5:
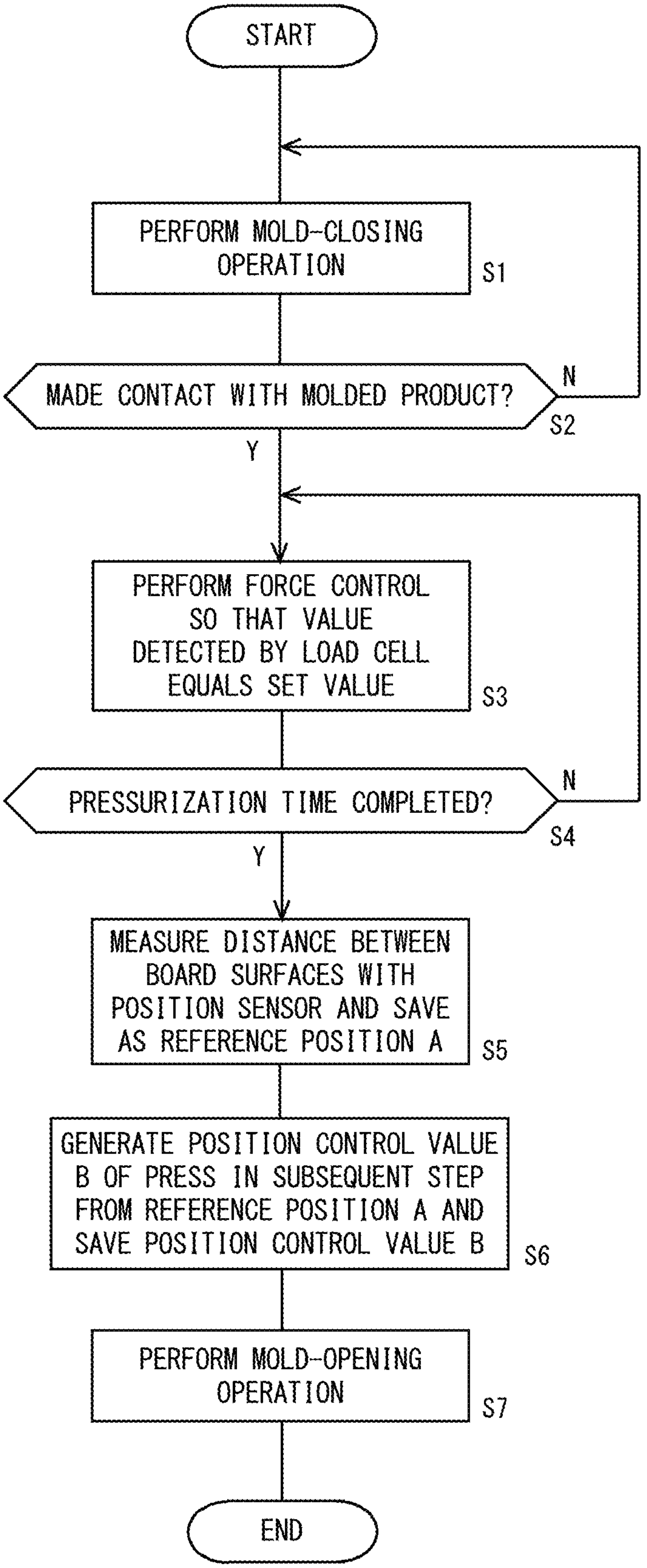
FIG. 5 is a flowchart showing control of the second press step by the second press apparatus.

Next, the second press step by the second press apparatus 13 will be described using the graph shown in FIG. 3 and the flowchart shown in FIG. 5. The servomotor 16 of the second press apparatus 13 is actuated, the lower board 54 and the pressurization block 60 are raised, and a mold-closing operation of the second press step is started (S1). When the laminate molded product P on the pressurization surface of the pressurization block 60 mounted to the lower board 54 and the pressurization surface of the pressurization block 60 mounted to the upper board 52 come into contact with each other (S2=Y), pressurization is started. In the second press step, closed loop control using force control (pressure control) such as that shown in FIG. 3 is performed in a similar manner to the first press step by the first press apparatus 12. Specifically, force control due to feedback control in which the servomotor 16 is driven is performed so that the detected value of the load cell 59 becomes a setting value (S3). Since a relationship with the block diagram shown in FIG. 2 is the same as the first press step by the first press apparatus 12, a description will be omitted.

The pressurization force (pressure per unit area that is applied to the laminate molded product) in doing so ranges from, for example, 0.3 MPa to 3.0 MPa. While force control is performed in terms of control of the servomotor 16, pressure (surface pressure) is shown in a display screen and the like for better understanding. Once the load cell 59 detects that the pressurization force has reached predetermined molding pressure having been set, compression is completed and closed loop control is performed so as to maintain the predetermined pressure.

In addition, while a temperature of the pressurization blocks 60 and 61 of the second press apparatus 13 at this time varies depending on a material of the laminate molded product, temperature control is performed to 50° C. to 200° C. and more preferably to 80° C. to 150° C. In the second press apparatus 13, both upper and lower pressurization surfaces are provided with the metal press plate 65 via the buffer material 64 with the hardness and the thickness described above. Therefore, even though elasticity is not as high as that of the elastic body sheet 43 of the pressurization surfaces of the first press apparatus 12, a difference between the actual thickness of the laminate molded product P and a detected value by a position sensor becomes more approximated. However, since the metal press plate 65 is not a completely rigid body, a situation where only a portion in proximity of the convex part of the substrate is extremely strongly pressed is suppressed and the laminate molded product P (secondary laminate molded product) is pressure-molded by performing adhesion of the substrate and the laminate film in a state where the laminate film is embedded in the concave part of the substrate.

Once a set pressurization time ends (S4=Y), pressurization force control is ended and decompression is started. A time point where pressurization ends and pressurization force becomes 0 is a point where, as shown in FIG. 3, the molded product is released from the mold and a thickness of the final molded product is reached. From this point, the servomotor 16 is driven in an opposite direction to lower the lower board 54 and the pressurization block 60 and mold release of the laminate molded product P (secondary laminate molded product) having been abutted against the respective pressurization surfaces of the pressurization blocks 60 and 61 via the carrier films F1 and F2 is performed.

While only force control is performed in the second press step by the second press apparatus 13 in the present embodiment, at least force control may be performed in the second press step. In other words, position control (including speed control) may be concomitantly used from the beginning, after a predetermined amount of time elapses, or after reaching a predetermined position. Position control (including speed control) may be solely performed after a predetermined amount of time elapses or after reaching a predetermined position. When driving means of the first press apparatus 12 is a hydraulic cylinder, portions of force control are replaced with pressure control. When only force control (pressure control) is performed or when control including elements of force control (pressure control) is performed in the first embodiment, the thickness of the laminate molded product P (secondary laminate molded product) after pressure-molding ends is not actually completely controlled to a same thickness. However, gradually making a state of irregularities on the surface of the laminate molded product P and controlling thickness of the laminate molded product P towards a final laminate molded product P are meaningful. Regarding the thickness of the laminate molded product P, adjusting the thickness of the secondary laminate molded product so as to approximate values of an allowable range of the final laminate molded product P is important in performing position control in the third press apparatus 14 without having to press the laminate molded product P with excessive pressure.

In the present invention, a distance between board surfaces of the upper board 52 and the lower board 54 (the thickness of the laminate molded product P (primary laminate molded product)) is measured by the linear scale 62 that is a position sensor at least at the end of pressure-molding by the second press apparatus 13 and the measured distance is stored in the storage apparatus 106 of the control apparatus 20 as a reference position A that is a type of a physical quantity (S5). In doing so, when the second press apparatus 13 includes two or more position sensors such as linear scales 62, the measured value of any one of the linear scales 62 may be used to control the third press apparatus 14 in the subsequent step or a larger value or a smaller value of the measured values may be automatically determined and used for control. An average value of the measured values of all of the linear scales 62 may be used to control the third press apparatus 14. In addition, when the second press apparatus 13 and the third press apparatus 14 are press apparatuses of a same type including a plurality of servomotors, for example, a measured value of the rotary encoder 55 of one of the servomotors 16 of the second press apparatus 13 may be stored and used to control one of the servomotors 17 (at a same position) of the third press apparatus 14 that molds the same laminate molded product P, and a measured value of the rotary encoder 55 of the other servomotor 16 of the second press apparatus 13 may be stored and used to control the other servomotor 17 (at a same position) of the third press apparatus 14 that molds the same laminate molded product P. A similar description applies when the second press apparatus 13 and the third press apparatus 14 respectively include pluralities of linear scales 62 and 82.

The reference position A may be compared with a position of the rotary encoder 55 of the servomotor 16 and the value of one position may be selected as a control value. The rotary encoder 55 of the servomotor 16 corresponds to the position sensor that measures a distance between the base board 51 and the lower board 54 according to the present embodiment. In addition, when the servomotor 16 is mounted to the upper board 52 and the ball screw nut 58 is mounted to the lower board 54 that ascends and descends, the rotary encoder 55 of the servomotor 16 functions as a position sensor that measures a distance between the upper board 52 and the lower board 54. In doing so, while the distance between board surfaces is usually measured at the end of pressure-molding, if thickness is not precisely adjusted through position control or the like during a percentage of the time in the latter half, the distance between board surfaces upon end of forward pressurization at a time point where the thickness finally stops from becoming thinner may be measured instead of the distance between the board surfaces (thickness of the laminate molded product) upon end of pressure-molding. Furthermore, when the distance between the board surfaces is measured, the measured value (physical quantity) is used as the reference position A in control by the third press apparatus 14 that is the press apparatus in the immediately subsequent step. More specifically, a position control value B of the press apparatus 14 in the subsequent step is generated from the reference position A and saved (S6) to be used for control. The generation of the position control value B of the third press apparatus 14 in the subsequent step may be performed before the start of pressure-molding by the third press apparatus 14. Therefore, the control of the third press apparatus 14 is to be associated with each laminate molded product P and will be different each time.

Once a predetermined amount of time elapses, the second press step by the second press apparatus 13 ends, and the laminate molded product P (secondary laminate molded product) is laminate-molded, the servomotor 16 is driven to perform a mold-opening operation in which the lower board 54 is lowered (S7). Since the surface of the secondary laminate molded product that is pressure-molded at this point has been pressure-molded by the pressurization blocks 60 and 61 including the metal press plate 65 with elasticity via the buffer material 64 as the pressurization surfaces of the second press apparatus 13, in most cases, the irregularities remaining on the surface of the primary laminate molded product are processed to become flatter. In addition, the thickness of a thickest portion is more often than not thinner in the secondary laminate molded product than in the primary laminate molded product.

Since only force control or control in which an element of force control represents a majority of control elements is likely to be performed in the first press apparatus 12 and the second press apparatus 13 as described above, in particular, force detecting means such as a load cell or a tie bar sensor may be essential.

In addition, due to feeding of the carrier films F1 and F2 by the unwinding roll 21, the driven roll 22, the unwinding roll 24, and the driven roll 25 of the carrier film sending apparatus 18 and winding of the carrier films F1 and F2 by the winding rolls 91 and 93 of the winding apparatus 19, the laminate molded product P (secondary laminate molded product) is conveyed to between the upper board 72 and the lower board 74 of the third press apparatus 14 in the subsequent step to the second press apparatus 13 and stops at a predetermined pressurization position.

Figure 6:
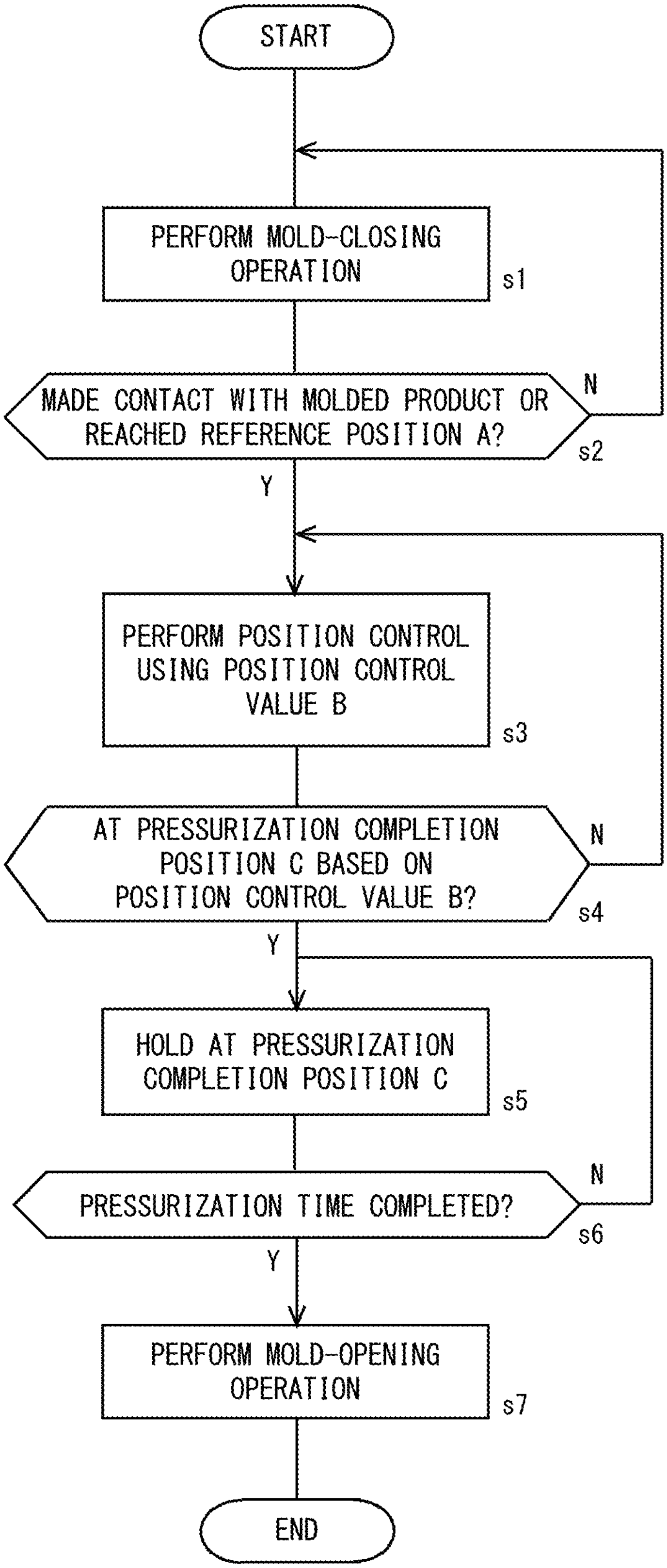
FIG. 6 is a flowchart showing control of the third press step by the third press apparatus.

Next, the third press step by the third press apparatus 14 will be described using the graph shown in FIG. 4 and the flowchart shown in FIG. 6. The servomotor 17 of the third press apparatus 14 is actuated, the lower board 74 and the pressurization block 80 are raised, and a mold-closing operation of the third press step is started (s1). When the laminate molded product P on the pressurization surface of the pressurization block 80 mounted to the lower board 74 and the pressurization surface of the pressurization block 80 mounted to the upper board 72 come into contact with each other (s2=Y), pressurization is started. In doing so, if the second press apparatus 13 and the third press apparatus 14 share the same specifications, the reference position A measured in the second press step of the previous step may be adopted as a switching position to start of pressurization.

Figure 4:
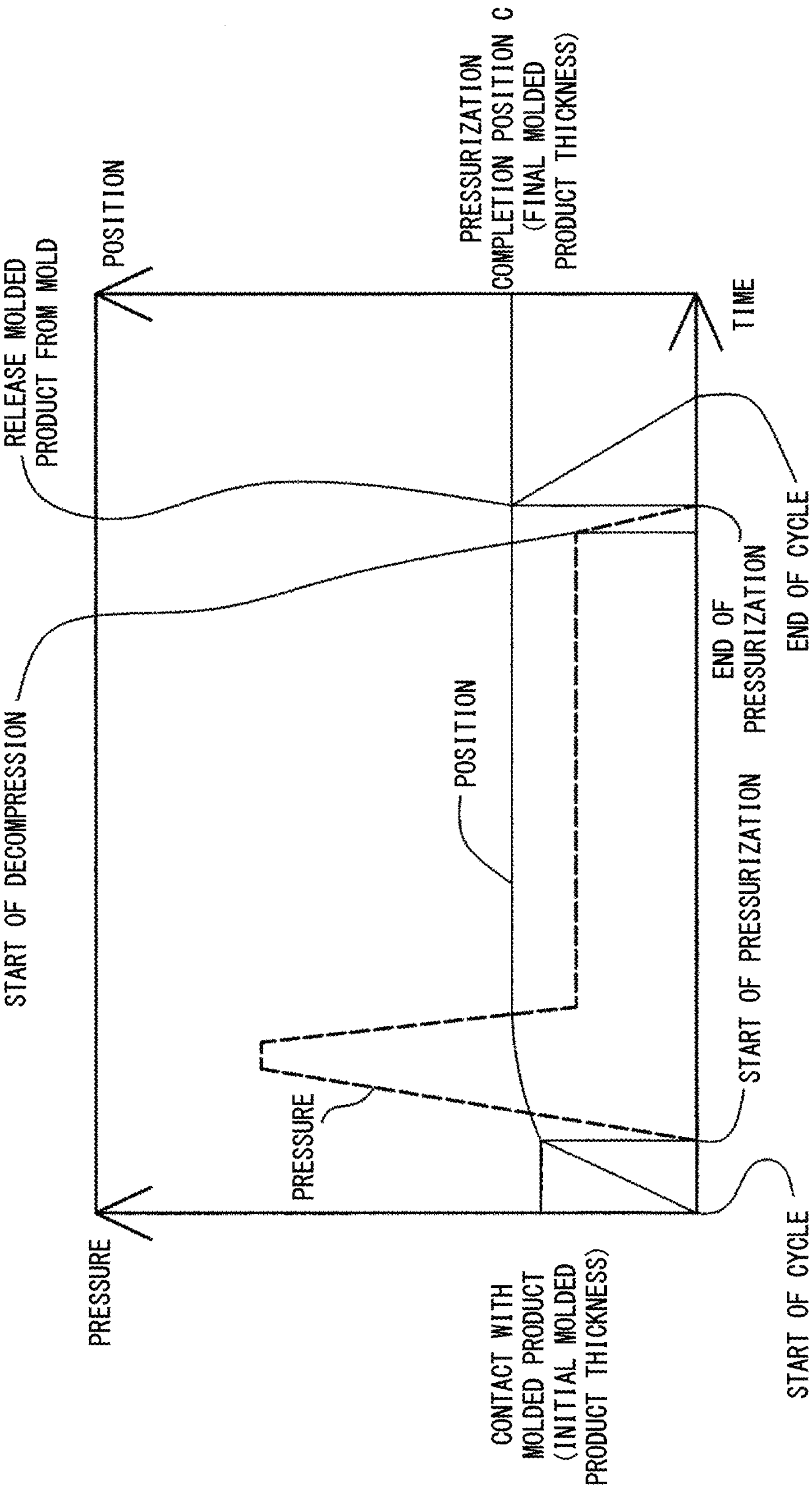
FIG. 4 is a graph showing a relationship between pressure and position in a third press step by a third press apparatus.

In addition, as pressurization control in the third press step, closed loop control using position control (speed control) such as that shown in FIG. 4 is performed. In other words, control using the thickness (reference position A) that is the physical quantity detected in the second press step of the previous step and stored in the storage apparatus 106 is performed and position control using the position control value B generated from the reference position A is performed (s3). To describe this point in greater detail in terms of a relationship with the block diagram shown in FIG. 2, a value of the linear scale 62 is added to or subtracted from a position command signal sent from the position command signal output unit 111 by the adder 114, a command signal is generated by the command signal generating unit 115 via the force/position comparison/switching unit 112, and the command signal is transmitted to the servo amplifier 56. In addition, when force control is concomitantly used instead of solely using position control, a value of the load cell 39 is added to or subtracted from a force command signal sent from the force command signal output unit 110 by the adder 113, the position command signal and the force command signal are summed by the force/position comparison/switching unit 112, a final command signal is generated by the command signal generating unit 115, and the command signal is transmitted to the servo amplifier 56.

Furthermore, in terms of a relationship with the actual laminate molded product P, in the third press step, control due to position control (or speed control) is performed from the beginning. In addition, stroke control (position control) is performed with respect to a same laminate molded product P (secondary laminate molded product) according to the position control value B generated so that the thickness of the laminate molded product P is reduced by a predetermined value from the thickness (reference position A) of the laminate molded product P measured by the press apparatus 13 in the previous step. In other words, closed loop control is performed based on a command of moving the lower board 54 by a predetermined stroke from a given position before start of forward movement to a position upon end of the forward movement. In doing so, control may be performed so that thickness is always reduced by a same stroke among the large number of laminate molded products P (secondary laminate molded products) to be sent or, in accordance with a variation in measured thicknesses of the laminate molded products P (secondary laminate molded products), the stroke may be increased when the thickness is relatively thick and the stroke may be reduced when the thickness is relatively thin so as to eliminate differences in thickness among the laminate molded products P (final laminate molded products) or adjust the differences in thickness to within a range of acceptable products. The control in this case can be described as position control in which a final target position is set to a specific value by calculation. In addition, when the laminate molded product P reaches a pressurization completion position C (target position) in a set stroke (s4=Y), the laminate molded product P is held at the pressurization completion position C (s5). Therefore, the thickness of a final laminate molded product is more often than not thinner than the thickness (of a thickest portion) of the secondary laminate molded product. As for pressure detected by the load cell 79, while compression is performed in an initial stage of stroke control during which the laminate molded product P moves to the pressurization completion position C (target position) as shown in FIG. 4, pressure drops once the laminate molded product P reaches the pressurization completion position C (target position) since the laminate molded product P merely holds its position.

In the laminate molding system 11, since the first press apparatus 12, the second press apparatus 13, and the third press apparatus 14 simultaneously perform press molding and press times are set to a same time, a mold-closed state is maintained and position holding is performed regardless of which press apparatus reaches a target position. Once a predetermined pressurization time ends (s6=Y), the servomotor 16 is driven in an opposite direction to lower the lower board 74 and the pressurization block 80, mold release of the laminate molded product P (final laminate molded product) having been abutted against the respective pressurization surfaces of the pressurization blocks 80 and 81 via the carrier films F1 and F2 is performed, and a mold-opening operation is performed (s7).

Although the reason for measuring the thickness of the laminate molded product P (secondary laminate molded product) (a physical quantity of the second press apparatus 13) upon end of pressure-molding or upon end of forward pressurization by the second press apparatus 13 in the previous step is as described in the section titled "Summary of Invention", it is also because when attempting to start a pressurization step after accurately measuring the thickness of the laminate molded product P when the laminate molded product P and the pressurization surface abut against each other (upon start of pressurization) in the third press apparatus 14 of the subsequent step, the thickness of the laminate molded product P cannot be measured with high accuracy due to the lower board 74 ascending at a constant speed and the surface of the laminate molded product P being soft. Therefore, an accurate thickness needs to be measured upon end of pressure-molding or upon end of forward pressurization by the second press apparatus 13 in the previous step.

In addition, while only position control (speed control) is performed in the third press step by the third press apparatus 14 in the present embodiment, at least position control may be performed in the third press step. In other words, force control (including pressure control) may be concomitantly used from start to end, after a predetermined amount of time elapses from the start, or from the start and until a predetermined position is reached. In any case, in a final stage, a final thickness is adjusted so that only position control is performed or control in which an element of position control represents a majority of control elements is performed.

Furthermore, in the position control (speed control) of the second press apparatus and the third press apparatus, a current value (torque) that is sent to the servomotor may be detected and a torque limit for preventing the current value (torque) from exceeding a predetermined value may be provided. In particular, a torque limit may be made an essential part of the position control (speed control) of the third press apparatus. Accordingly, a restriction may be imposed on a case of position control in which torque of a servomotor for reaching a target position becomes excessively large due to the stroke described above being large and occurrences of defects such as molten resin of the laminate film flowing sideways due to the laminate molded product being subjected to pressure equal to or higher than a certain level can be suppressed. In addition, while position control may take the form of speed control that involves transmitting, for example, a command to proceed forward to a given point in several seconds, as described above, such speed control is also included in the concept of position control. For example, in the example shown in FIG. 4, the stroke from making contact with a molded product to the pressurization completion position C may be performed by speed control and, once the pressurization completion position C is reached, control may be switched to position control to hold the pressurization completion position C.

The thickness of the laminate molded product P (final laminate molded product) at the end of the third press step by the third press apparatus 14 is an accurate thickness due to having performed the three-stage press steps described above and, in particular, measuring the thickness of the laminate molded product P at least at the end of pressure-molding of the second press apparatus 13 of the previous step and using the measured value of the thickness of the laminate molded product P in stroke control due to speed control of the third press apparatus 14 in the subsequent step. In addition, even when irregularities slightly remain on the surface of the secondary laminate molded product, pressure-molding can be performed to a further flattened laminate molded product P (final laminate molded product). Furthermore, due to feeding of the next carrier films F1 and F2 by the carrier film winding apparatus 19, the laminate molded product P (final laminate molded product) is conveyed to the extraction stage part 95 of the subsequent step to the third press apparatus 14 and further sent towards a next step by an apparatus (not illustrated).

As press apparatuses provided in the laminate molding system 11, at least two press apparatuses may be consecutively provided and a laminate molded product having been pressure-molded by the press apparatus in the previous step may be further pressure-molded by the press apparatus in the subsequent step. In other words, the laminate molding system 11 may be constituted by only the first press apparatus 12 and the second press apparatus 13, the thickness of the laminate molded product P may be measured at least at the end of pressure-molding of the first press apparatus 12, and the measured value of the thickness of the laminate molded product P may be used in control of the second press apparatus 13. Alternatively, a press apparatus such as a fourth press apparatus may be provided subsequent to the third press apparatus 14, the thickness of the laminate molded product P may be measured at least at the end of pressure-molding of the press apparatus in the previous step, and the measured value of the thickness of the laminate molded product P may be used in control of the press apparatus in the subsequent step.

In addition, since pressurization surfaces of the second press apparatus 13 and the third press apparatus 14 are metal press plates and only position control or control including an element of force control may be performed, a position sensor for particularly performing position control is preferably provided in addition to the rotary encoders 55 and 75 of the servomotors 16 and 17.

Alternatively, besides the thickness of the laminate molded product P (secondary laminate molded product) measured by the position sensor, the physical quantity measured during pressure-molding or after end of pressure-molding in the second press apparatus 13 may be a force measured by a load cell or pressure detected by a pressure sensor. In other words, when performing control that prioritizes position control in a latter half or at least at the end of the second press apparatus 13, the detected force (pressure) may not be a constant value. In such a case, a force (pressure) as a physical quantity is detected and used in control of the third press apparatus 14 in the subsequent step. In addition, a sensor that measure the physical quantity in the second press apparatus 13 may be a temperature sensor that measures a temperature of the pressurization blocks 60 and 61 or the laminate molded product P. When the temperature of the laminate molded product P is high, since the portion of the laminate film in the laminate molded product P is in a softer state, control of the press apparatus 14 in the subsequent step may be changed according to the temperature information. Furthermore, the physical quantity measured by a sensor in the second press apparatus 13 may be an amount of extrusion of resin from a side surface of the laminate molded product P as measured by a camera (sensor), a degree of irregularities of the surface of the laminate molded product P, an amount of positional displacement of the laminate molded product P, or a state of the laminate molded product P such as a value of electrical characteristics such as a resistance value with respect to the laminate molded product P. Moreover, the physical quantity measured by a sensor in the second press apparatus 13 may include at least two or more of the physical quantities described above.

In addition, while a timing of measuring the physical quantity that is measured by a sensor in the first press apparatus 12 is most desirably at the end of pressure-molding, a state of slightly before the end of pressure-molding may be measured. Specifically, the thickness of the laminate molded product P may be measured using the linear scale 62 that is a position sensor after the start of decompression. Furthermore, the physical quantity may be measured at a time within a final 20% of the entire pressure-molding time or, more preferably, at a time within a final 10% of the entire pressure-molding time. Moreover, the measurement of the physical quantity is not limited to upon pressure-molding (during pressure-molding) and, in the case of a measurement by a camera or the like, the measurement may be performed after mold-opening (after pressure-molding) or in a state where the laminate molded product P is retained in the second press apparatus 13 and is not moving toward the third press apparatus 14. Even when the physical quantity of the laminate molded product P is directly measured by a sensor such as a camera or a contactless temperature sensor, the measurement is included in a measurement of a physical quantity of the second press apparatus 13 as long as the laminate molded product P is retained at a molding position of the second press apparatus 13.

Furthermore, in addition to a position (thickness), at least one of characteristics such as a force (pressure), a temperature, a shape of the laminate molded product P, a position of the laminate molded product P, and an electrical characteristic value of the laminate molded product P or a plurality of these elements may be detected as physical quantities by a sensor, and the plurality of physical quantities may be incorporated into control of the third press apparatus 14 and used for pressurization control of the same laminate molded product P. In other words, by measuring a position (thickness), a force (pressure), a temperature, and the like which are physical quantities during pressure-molding or at the end of pressure-molding of the second press apparatus 13 in the previous step with respect to the same laminate molded product P and utilizing the physical quantities in control of the third press apparatus 14 in a subsequent step, a molding yield of the laminate molded product P (final laminate molded product) can be improved.

Next, measures against thermal expansion in the laminate molding system 11 according to the present embodiment will be described. A first measure against thermal expansion is a measure against thermal expansion of the upper boards 32, 52, and 72, the lower boards 34, 54, and 74, the tie bars 33, 53, and 73, the pressurization blocks 40, 41, 60, 61, 80, and 81, the ball screws 37, 57, and 77, and the like of the first press apparatus 12, the second press apparatus 13, and the third press apparatus 14. As described above, in the laminate molding system 11, origins of the scale 62 and the like are set prior to laminate molding and control is performed based on values from the origins. However, when the number of molding operations in the laminate molding system 11 increases, thermal expansion occurs in each element due to heat of the pressurization blocks 40, 41, 60, 61, 80, and 81 being thermally conducted to the upper boards 32, 52, and 72, the lower boards 34, 54, and 74, and the tie bars 33, 53, and 73 and the temperatures of the ball screws 37, 57, and 77 rising due to heat of friction. For example, when board-to-board distances between the upper boards 32, 52, and 72 and the lower boards 34, 54, and 74 are measured by the linear scales 42, 62, and 82, thermal expansion of the pressurization blocks 40, 41, 60, 61, 80, and 81 or thermal expansion of a portion of a part of the upper boards 32, 52, and 72 and a portion of a part of the lower boards 34, 54, and 74 are not reflected onto measurement by the linear scales 42, 62, and 82.

Therefore, when these members thermally expand, an actual interval between pressurization surfaces (thickness of the laminate molded product P) may be smaller than detected values of the linear scales 42, 62, and 82 (values from control origins). In consideration thereof, in the present embodiment, a control value is corrected so as to correspond to the thermal expansion of a press apparatus by taking elements such as an actually measured value of the temperature of each part and the number of molding operations into consideration with respect to a detected value. Correction of thermal expansion is performed by the thermal expansion correction unit 109 of the first press apparatus control unit 102, the second press apparatus control unit 103, and the third press apparatus control unit 104 of the control apparatus 20. Specifically, correction is desirably applied to a value of a command value without correcting an origin position. For example, when performing position control during pressurization in a case of using the scale 62 in which a detected position value increases as a positive value in a mold-opening direction with a control origin being 0, the value of the command value such as a stop position of position control is significantly changed. In addition, the stop position is moved back by an amount corresponding to thermal expansion of the pressurization blocks 60, 61, and the like. Furthermore, when stroke control is to be performed from an abutting position with the laminate molded product A, the command value of the stroke is reduced. An abutting position when the mold is closed cannot be accurately detected as already described earlier in the portion titled "Summary of Invention". Therefore, applying correction with the abutting position of the laminate molded product A and the pressurization block 60 and the like as an origin position during actual molding can be described as being difficult. In the present invention, only position control or control in which an element of position control represents a majority of control elements is performed particularly by the third press apparatus 14, at least control of the third press apparatus 14 in the subsequent step desirably involves correcting a control value so as to correspond to the thermal expansion of the press apparatus 14. However, the first press apparatus 12 and the second press apparatus 13 can also correct control values during pressurization so as to correspond to thermal expansion.

In addition, as timings of correction of thermal expansion in the laminate molding system 11, the correction may be performed when each of the press apparatuses 12, 13, and 14 reaches a predetermined number of molding operations set in advance. In this case, in the laminate molding system 11, when correction of thermal expansion is simultaneously applied in all of the press apparatuses 12, 13, and 14, for example, a laminate molded product A of which primary molding has been performed before the correction of thermal expansion but secondary molding and tertiary molding have been performed after the correction of thermal expansion will be produced among the laminate molded products A being sequentially sent. Therefore, it is also preferable to stagger timings of correction of thermal expansion of the press apparatuses 12, 13, and 14 for each laminate molded product A in such a manner that molding before correction of thermal expansion is performed in all of the press apparatuses 12, 13, and 14 or molding after correction of thermal expansion is performed in all of the press apparatuses 12, 13, and 14. In other words, only the first press apparatus 12 performs correction of thermal expansion after an N-th laminate molding operation, only the second press apparatus 13 performs correction of thermal expansion after an N+1-th laminate molding operation, and only the third press apparatus 14 performs correction of thermal expansion after an N+2-th laminate molding operation. Furthermore, as timings of correction of thermal expansion in another laminate molding system 11, temperatures of the press apparatuses 12, 13, and 14 may be detected and correction of thermal expansion may be performed at a time point where the press apparatuses 12, 13, and 14 reach a predetermined temperature. In other words, temperature sensors may be provided on the upper board, the tie bars, the lower board, the ball screws, and the like which are portions where a rise in temperature is delayed as compared to the pressurization blocks and the like and correction of thermal expansion may be performed from whichever of the press apparatuses 12, 13, and 14 in which the temperature sensors detect that the portions have reached a predetermined temperature.

A second measure against thermal expansion relates to a measure against thermal expansion of the laminate molded product P that is pressure-molded by the first press apparatus 12, the second press apparatus 13, and the third press apparatus 14. When side surfaces of the laminate molded product P are opened during pressure-molding of the laminate molded product P by the first press apparatus 12, the second press apparatus 13, and the third press apparatus 14, the laminate molded product P expands in the directions of the side surfaces and is likely to end up being a molded product with a thick central part. Therefore, the laminate molded product P is conveyed while being placed in a picture frame-like frame and pressure-molding is performed in the first press apparatus 12, the second press apparatus 13, and the third press apparatus 14 in a state where inner surfaces of the picture frame-like frame and side surfaces of the laminate molded product P abut against each other. Alternatively, a measure against thermal expansion of the laminate molded product P can be taken by pressurizing each side surface of the laminate molded product P using a pressurizing member during the pressure-molding. This has an additional effect of preventing the resin film in a molten state from flowing out sideways when excessive pressurization force is applied to the laminate molded product P.

Next, a method of manufacturing a laminate molded product using the laminate molding system 11 according to the present embodiment will be described. The laminate molded product P according to the present embodiment is a laminate molded product P for a buildup substrate and is constituted of a circuit board with irregularities and an interlayer insulator film superimposed on both surfaces of the circuit board. The method of manufacturing a laminate molded product according to the present embodiment includes pressing pressurization surfaces made of the elastic body sheet 43 against the laminate molded product P to produce a primary laminate molded product due to control accompanying force control using the servomotor 15 inside the depressurized chamber VC of the first press apparatus 12. In addition, next, pressurization surfaces made of the metal press plate 65 are pressed against the primary laminate molded product to produce a secondary laminate molded product due to control at least accompanying force control using the servomotor 16 of the second press apparatus 13. Furthermore, next, pressurization surfaces made of the metal press plate 85 are pressed against the secondary laminate molded product to produce a final laminate molded product due to control at least accompanying position control using the servomotor 17 of the third press apparatus 14.

Figure 7:
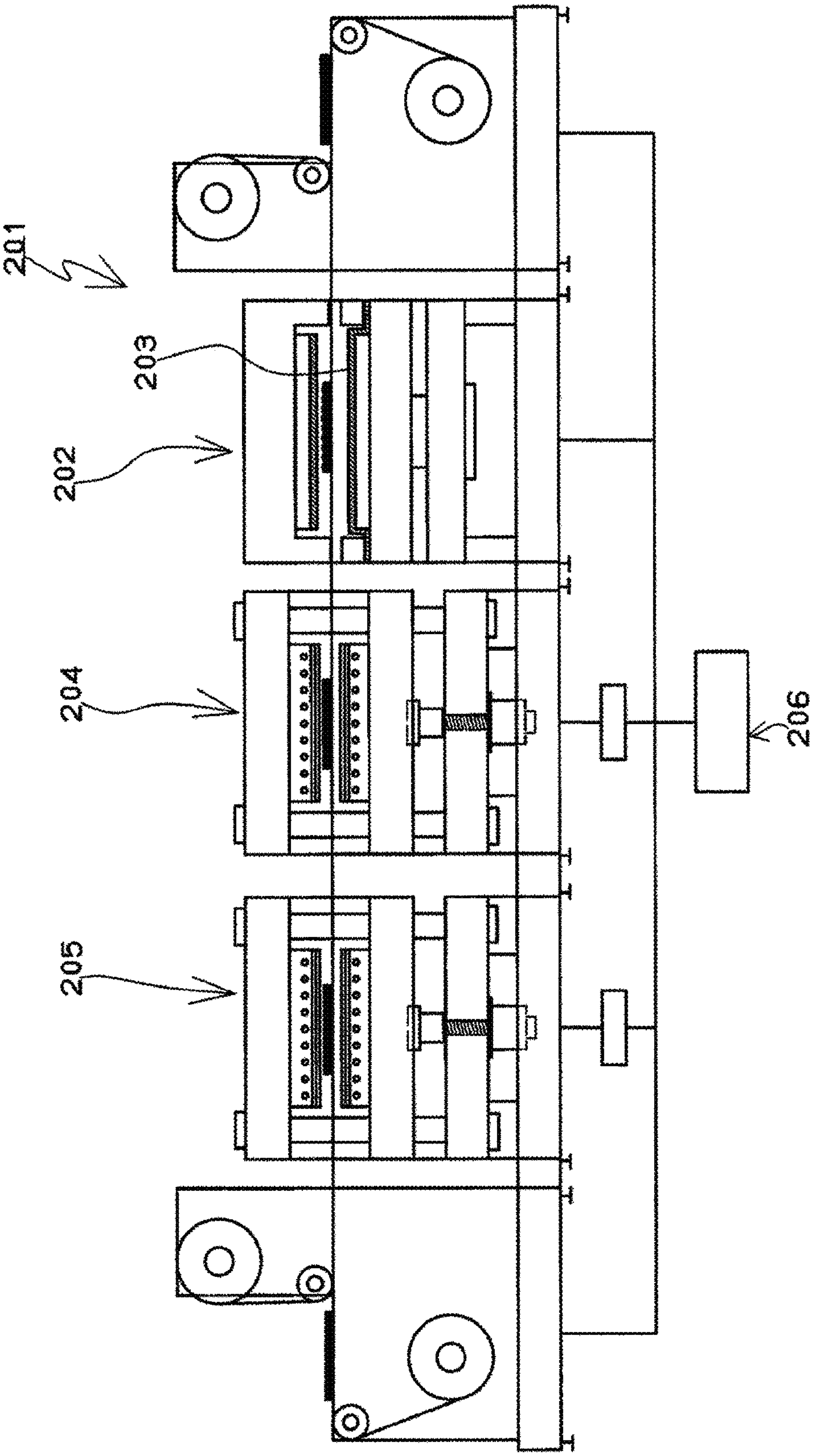
FIG. 7 is a schematic explanatory diagram of a laminate molding system according to a second embodiment.

Next, a laminate molding system 201 according to a second embodiment will be described with reference to FIG. 7. In the laminate molding system 201 according to the second embodiment, a vacuum laminating apparatus 202 of an initial molding stage includes a diaphragm 203 that expands due to compressed air inside a chamber VC that can be depressurized. In addition, a first press apparatus 204 and a second press apparatus 205 are consecutively provided in a subsequent step to the vacuum laminating apparatus 202. In other words, the second press apparatus 13 of the laminate molding system 11 according to the first embodiment corresponds to the first press apparatus 204 of the laminate molding system 201 according to the second embodiment and the third press apparatus 14 of the laminate molding system 11 according to the first embodiment corresponds to the second press apparatus 205 of the laminate molding system 201 according to the second embodiment.

Since structures of the first press apparatus 204 and the second press apparatus 205, functions of a control apparatus 206 of the laminate molding system 201, and a control method of the laminate molding system using the first press apparatus 204 and the second press apparatus 205 are more or less in common with the first embodiment, the description of the first embodiment will be incorporated and overlapping descriptions will be omitted. A difference is that, since the vacuum laminating apparatus 202 uses the diaphragm 203, position control cannot be performed.

While an exhaustive enumeration will not be provided, it is needless to say that the present invention is not limited to the first and second embodiments described above and also applies to modifications made by those skilled in the art within the spirit of the present invention and combinations of respective descriptions of the first and second embodiments. In addition to circuit boards such as buildup substrates the laminate molded products that are laminate-molded in the laminate molding systems 11 and 201 may be used in, but not limited to, other plate-like bodies such as semiconductor wafers and solar cells.

The present application claims priority on the basis of Japanese Patent Application No. 2022-068931 filed on Apr. 19, 2022 and Japanese Patent Application No. 2022-084630 filed on May 24, 2022, the entire contents of which are incorporated herein by reference.

REFERENCE SIGNS LIST

11, 201 LAMINATE MOLDING SYSTEM
12, 204 FIRST PRESS APPARATUS
13, 205 SECOND PRESS APPARATUS
14 THIRD PRESS APPARATUS
15, 16, 17 SERVOMOTOR
20, 206 CONTROL APPARATUS
32, 52, 72 UPPER BOARD

34, 54, 74 LOWER BOARD
36, 56, 76 SERVO AMPLIFIER
39, 59, 79 LOAD CELL (FORCE DETECTING MEANS)
40, 41, 60, 61, 80, 81 PRESSURIZATION BLOCK
42, 62, 82 LINEAR SCALE (POSITION SENSOR)
43 ELASTIC BODY SHEET (PRESSURIZATION SURFACE)
65, 85 METAL PRESS PLATE (PRESSURIZATION SURFACE)
P LAMINATE MOLDED PRODUCT

The invention claimed is:

1. A control method of a laminate molding system in which at least two press apparatuses are consecutively provided and a laminate molded product having been pressure-molded by a press apparatus in a previous step is further pressure-molded by a press apparatus in a subsequent step, wherein a physical quantity during pressure-molding or after pressure-molding by the press apparatus in the previous step is measured, and the physical quantity is used to control the press apparatus in the subsequent step, wherein the laminate molded product is a laminate film superimposed on at least one of an upper side and lower side of a circuit board, and wherein the measured physical quantity is used to control a servomotor of the press apparatus in the subsequent step.

2. The control method of a laminate molding system according to claim 1, wherein the physical quantity is a thickness of a laminate molded product that is measured by a position sensor.

3. The control method of a laminate molding system according to claim 1, wherein a physical quantity during pressure-molding or after pressure-molding by the press apparatus in the previous step is measured with respect to a same laminate molded product, and the physical quantity is used to control the press apparatus in the subsequent step which is to pressure-mold the laminate molded product next.

4. A laminate molding system in which at least two press apparatuses are consecutively provided and a laminate molded product having been pressure-molded by a press apparatus in a previous step is further pressure-molded by a press apparatus in a subsequent step, the laminate molding system comprising:

a sensor configured to measure a physical quantity during pressure-molding or after pressure-molding by the press apparatus in the previous step; and a control apparatus configured to measure, using the sensor, a physical quantity during pressure-molding or after pressure-molding by the press apparatus in the previous step, store the physical quantity in a storage apparatus, and use the physical quantity to control the press apparatus in the subsequent step, wherein the laminate molded product is a laminate film superimposed on at least one of an upper side and lower side of a circuit board, and wherein the measured physical quantity is used to control a servomotor of the press apparatus in the subsequent step.

5. The laminate molding system according to claim 4, wherein the sensor is a position sensor configured to measure any of a distance between pressurization blocks, a distance between tables, and a distance between a base board and a lower board of the press apparatus in the previous step.

6. The laminate molding system according to claim 4, comprising a first press apparatus including a chamber configured to be depressurized and using a servomotor as a drive source, a second press apparatus using a servomotor as a drive source, and a third press apparatus using a servomotor as a drive source.

* * * * *